United States Patent [19]
Ejiri et al.

[11] 3,936,800
[45] Feb. 3, 1976

[54] PATTERN RECOGNITION SYSTEM

[75] Inventors: Masakazu Ejiri, Tokorozawa; Michihiro Mese, Kokubunji; Haruo Yoda; Sadahiro Ikeda, both of Hachioji, all of Japan

[73] Assignee: Hitachi, Ltd., Japan

[22] Filed: Mar. 27, 1974

[21] Appl. No.: 455,420

[30] Foreign Application Priority Data

Mar. 28, 1973 Japan.............................. 48-34493

[52] U.S. Cl. ..............340/146.3 MA; 178/DIG 33; 340/146.3 AE; 340/146.3 Y
[51] Int. Cl.² ......................................... G06K 9/12
[58] Field of Search............. 178/DIG. 33, DIG. 34; 340/146.3 MA, 146.3 AH, 146.3 AE, 146.3 H, 146.3 Y

[56] References Cited
UNITED STATES PATENTS

| | | | |
|---|---|---|---|
| 3,297,993 | 1/1967 | Clapper..................... | 340/146.3 AE |
| 3,522,586 | 8/1970 | Kiji et al................... | 340/146.3 MA |
| 3,701,095 | 10/1972 | Yamaguchi et al. ...... | 340/146.3 MA |
| 3,740,466 | 6/1973 | Marshall et al. ........... | 178/DIG. 33 |
| 3,805,239 | 4/1974 | Watanabe.................. | 340/146.3 MA |

*Primary Examiner*—Leo H. Boudreau
*Attorney, Agent, or Firm*—Craig & Antonelli

[57] ABSTRACT

A pattern recognition system in which an image plane is divided into a large number of micro-regions, the image of the background has been stored in advance by a unit of the micro-region as invariable information independent of the brightness of the image plane, inputted images and the stored information are successively compared, and the proportion of occupation of the image plane by an object getting in the field of vision is detected.

7 Claims, 63 Drawing Figures

FIG. 14a
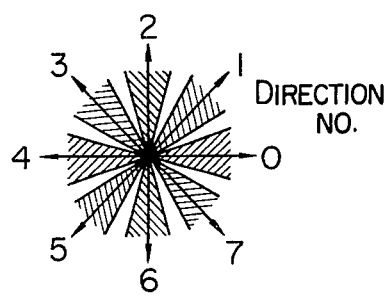
FIG. 15a
| 0 | 1 | 1 | 0 | 0 | 0 | 0 | 1 |
|---|---|---|---|---|---|---|---|
7 6 5 4 3 2 1 0 ---- BIT NO.
7 6 5 4 3 2 1 0 ---- DIRECTION NO.
FIG. 14b
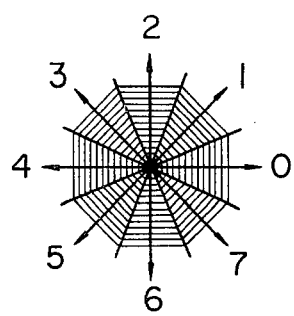
FIG. 15b
| 1 | 0 | 1 | 1 | 1 | 0 | 1 | 0 |
|---|---|---|---|---|---|---|---|
7 6 5 4 3 2 1 0 ---- BIT NO.
MAXIMUM DIRECTION NO. / NUMBER OF PICTURE ELEMENTS FIG. 37a  FIG. 37b
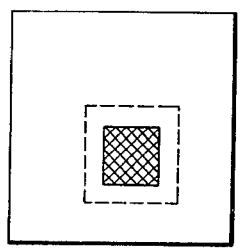 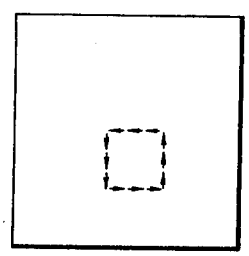
FIG. 38a  FIG. 38b
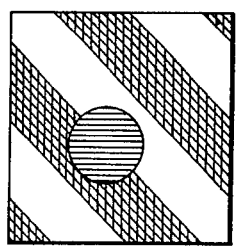 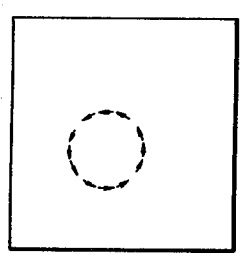
FIG. 39a
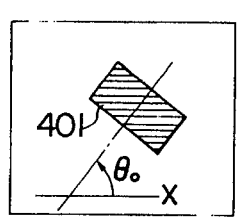
FIG. 39b
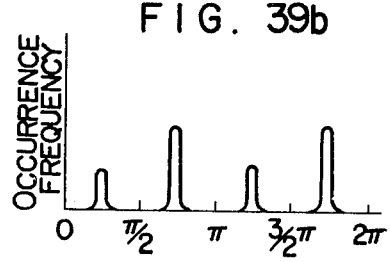

PATTERN RECOGNITION SYSTEM

The present invention relates to an image information processing system which blanks a predetermined background pattern or relieves or "embosses" only a characteristic pattern having a certain property from a two-dimensional image subjected to a photoelectric conversion by an image pick-up device, and more particularly, to a pattern recognition system which automatically identifies characters, figures, material bodies, etc.

Ordinarily, in recognizing characters, figures, material bodies, etc., very stringent conditions are put on the illumination at the time of picking up images. This is because, even if a pattern the value of the image of which is $f(x, y)$ at the coordinates $(x, y)$ is obtained under a certain illuminating condition, various images $g(x, y)$ differing in the contrast and black level from each other as expressed by Formula (1)

$$g(x, y) = a \cdot f(x, y) + b \qquad (1)$$

where $a$ and $b$ are constants, are often obtained even from the same object if the illumination changes, and hence the automatic recognition processing by the comparison of patterns becomes very difficult. The change like Formula (1) is caused not only by the illumination but also by the automatic gain control circuit of the image pick-up device and the like. In particular, it becomes a very difficult problem in recognizing an object with different background brightness.

An object of the present invention is to provide an apparatus for once transforming all the images expressed by Formula (1) into an image independent of the parameters $a$ and $b$ to facilitate an automatic recognition.

Another object of the present invention is to provide an apparatus for performing easily image processing such as extracting the contour of an object oriented in a specified direction from the output image of the above-mentioned image transforming apparatus.

A further object of the present invention is to provide a simple pattern recognition apparatus using the output image of the above-mentioned image transforming apparatus.

According to the present invention there is provided a recognition system comprising means for picking up an image of an object, means for dividing the picked up image into a plurality of regions, means for encoding the image signals in the divided regions region by region, means for storing in advance an image corresponding to the background at each region in a code, means for comparing the coded image signal and the stored coded signal to decide the degree of agreement therebetween, and means for counting the number of the regions depending on the degree of agreement.

The present invention is characterized in that an inputted image is, regardless of whether it is the image expressed by $g(x, y)$ or Formula (1) or the image represented by $f(x, y)$, transformed into the same image independent of the parameters $a$ and $b$.

The above and other objects, features and advantages of the present invention will become more apparent from the following detailed description of the preferred embodiments of the present invention when taken in conjunction with the accompanying drawings, in which:

FIGS. 12 to 15b are diagrams for explaining the principle of the recognition system according to the present invention;

FIG. 33b is an explanatory diagram of the coded image of the image of FIG. 33a;

FIGS. 37a to 38b are explanatory diagrams of images obtained by the present invention;

FIGS. 39a to 39c are diagrams for explaining the principle of the image processing system according to the present invention;

Figure 1:
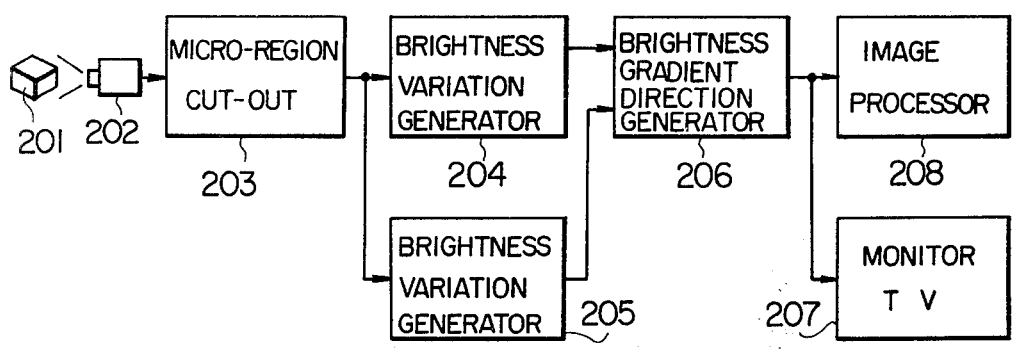
FIG. 1 is a block diagram of the entire structure of the image processing system according to the present invention.

The principle on which the present invention is based will first be described. If a vector $\vec{V}$ is composed of components $f_x$ and $f_y$ which are the longitudinal change of the brightness and the transverse change of the brightness of the image $f(x, y)$ $$f_x(x, y) = \frac{\delta f(x, y)}{\delta x}$$
$$f_y(x, y) = \frac{\delta f(x, y)}{\delta y}$$
(2)

as
$$\vec{V}(x, y: f) \equiv (f_x(x, y), f_y(x, y))$$
the argument $\theta$ of the vector $\vec{V}$ is defined as
$$\theta(x, y: f) \equiv \text{Arg}(\vec{V}(x, y: f)) \quad (3)$$
Then, the transform $\theta(x, y: f)$ of the image $f(x, y)$ agrees with the transformation image of all the images $g(x, y)$ represented by Formula (1). That is,
$$\theta(x, y: g) = \text{Arg}(\vec{V}(x, y: g))$$
$$= \text{Arg}\ ((g_x(x, y), g_y(x, y)),)$$
$$= \text{Arg}\ (a\cdot(f_x(x, y), f_y(x, y)),)$$
$$= \text{Arg}\ (a\cdot\vec{V}(x, y: f))$$
where ( . . . ), represents a row vector composed of the variables in the parentheses as its components and Arg ( . . . ) represents the argument of the vector in the parentheses. Since the argument of a vector is independent of the magnitude of the vector, $\theta(x, y: g)$ becomes for $a > 0$
$$\theta(x, y: g) = \text{Arg}\ (\vec{V}(x, y: f))$$
$$= \theta(x, y: f) \quad (4)$$

Consequently, if the image $f(x, y)$ is transformed into the image $\theta$ represented by Formula (3), all of the images represented by Formula (1) become the same image, and hence the recognition thereof becomes easy. Also, there is the advantage that the same object can be transformed into the same image even if the brightness of the background varies.

In the present invention which is based on such a principle the longitudinal and transverse rates of change in the brightness are first obtained at each point of the original picture, and then not the amount of variation in the brightness but the quantity indicating the direction of change at each point is obtained from these values. The direction of change is taken as the value of image at each point. Here, however, the directions in which the rates of change in the brightness are to be obtained are not limited to the longitudinal and transverse directions, but any two directions are equivalent thereto algebraically and hence will do provided that the two directions are independent of each other. In the present specification, therefore, the directions are taken to be the longitudinal and transverse directions for the sake of simplicity of description.

An image processing system according to the present invention will be described with reference to FIG. 1. An image pick-up device 202 of the raster scanning type such as a television camera picks up an image of an object 201. A micro-region cutting out apparatus 203 has delay elements as its components and can produce simultaneously a plurality of signals corresponding to micro-regions of an image. Apparatuses 204 and 205 are composed of, for example, adders and provide differences in brightness between different parts in the longitudinal and transverse directions in the micro-region as variations in brightness in the longitudinal and transverse directions therein, respectively. An apparatus 206 has one or more comparators and produces a digital code or an analog quantity indicating the direction of variation in the brightness in the micro-region by comparing the longitudinal and transverse variations of brightness. Thus, the brightness image of the object 201 is converted into an image signal in the direction of the maximum brightness variation in response to the variation in illumination by passing through the apparatuses 202 to 206. This signal is further supplied to a monitoring television 207 and an image processing apparatus 208 which complete a pattern recognition system.

Figure 2:
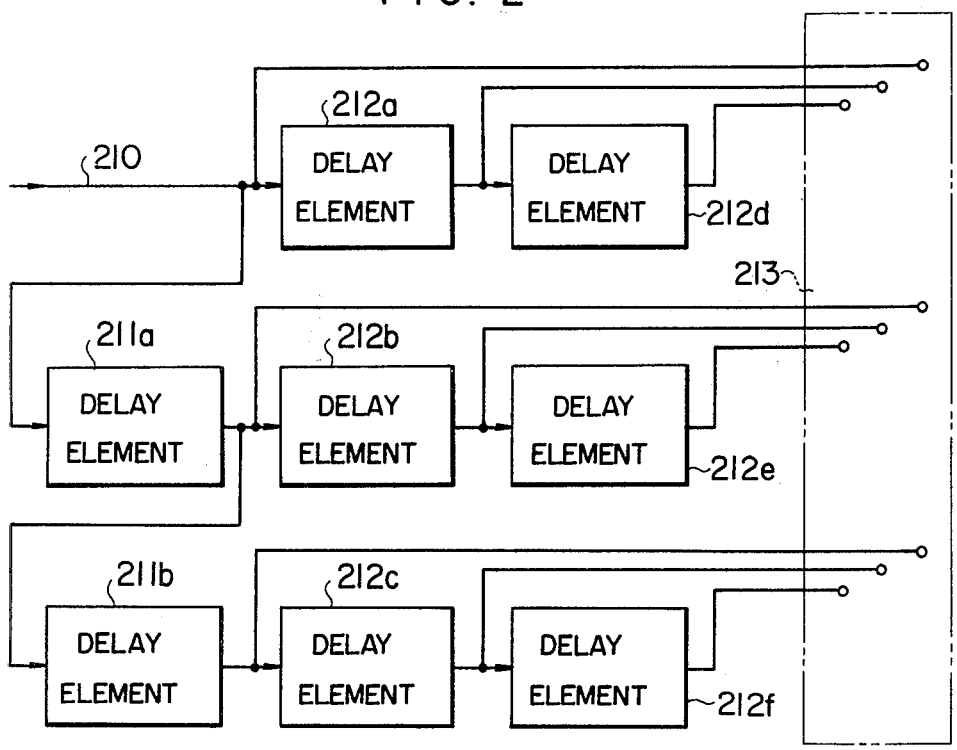
FIG. 2 is a block diagram of the micro-region cutting out apparatus in FIG. 1.
Figure 3:
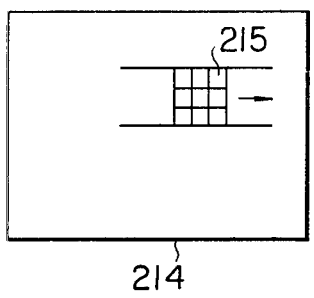
FIG. 3 is a diagram for explaining the operation of the apparatus of FIG. 2.

The image pick-up device 202 is one such as an ordinary ITV (industrial television) camera. The micro-region cutting out apparatus 203 is composed of a combination of delay elements as shown in FIG. 2, in which reference numeral 210 designates an image signal from the image pick-up device 202, reference numerals 211a and 211b designate delay elements having a delay time corresponding to one raster of the image, and reference numerals 212a to 212f designate delay elements having a delay time corresponding to one picture element. By such a construction an output circuit 213 having nine output terminals can supply in parallel image values corresponding to 3 × 3 micro-regions 215 on an image plane 214 as shown in FIG. 3. Furthermore, the 3 × 3 regions 215 on the image plane 214 is continuously scanned in synchronism with the scanning by the image pick-up device 202.

Figure 4:
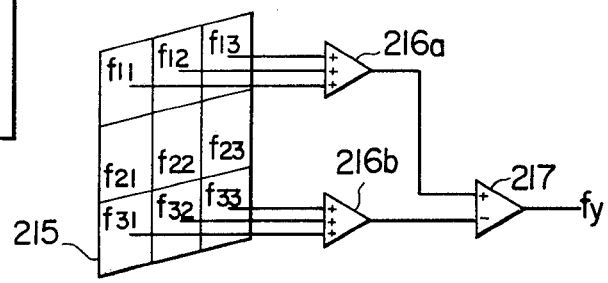
FIGS. 4 and 5 are diagrams for explaining the rate-of-change-of-brightness measuring apparatus in FIG. 1.
Figure 5:
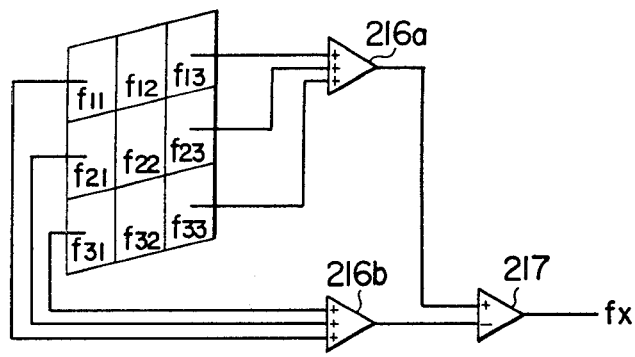

The longitudinal-brightness-variation detecting apparatus 204 can be structured as shown in FIG. 4. The reference numeral 215 designates the 3 × 3 micro-regions shown in FIG. 3 and the character $f_{ij}$ indicates the brightness at the corresponding micro-region. Reference numerals 216a and 216b designate adders and reference numeral 217 designates a subtractor the output of which is
$$(f_{11} + f_{12} + f_{13}) - (f_{31} + f_{32} + f_{33})$$
That is, the mean variation in the brightness in the vertical direction is approximately detected as a value proportional to $f_y(x, y)$ of Formula (2). The transverse-brightness-variation detecting apparatus 205 also is quite similarly structured as shown in FIG. 5 and can supply an approximate value of $f_x(x, y)$.

Figure 6:
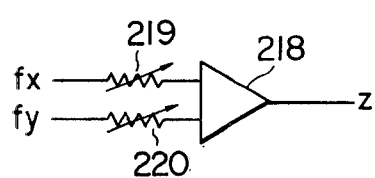
FIG. 6 is a diagram for explaining the direction-of-change-in-brightness detecting apparatus in FIG. 1.
Figure 7:
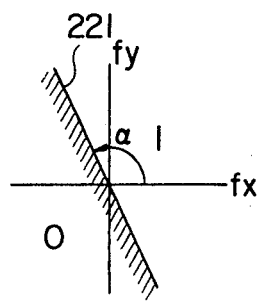
FIG. 7 is a diagram for explaining the operation of the apparatus of FIG. 6.

The brightness-variation-direction supplying apparatus 206 is constructed as follows. As shown in FIG. 6, the analog signals $f_x(x, y)$ and $f_y(x, y)$ are supplied to a comparator 218 through variable resistors 219 and 220. Then the output Z of the comparator 218 becomes $$Z = 1 \quad cf_x(x, y) + df_y(x, y) \geq 0$$
$$Z = 0 \quad cf_x(x, y) + df_y(x, y) < 0 \quad (5)$$

where $c$ and $d$ are constants determined by the resistors 219 and 220. This means that the output is produced which is 1 in the one half-plane bounded by a straight line 221 passing the origin in the $f_x(x, y) - f_y(x, y)$ plane as shown in FIG. 7 and is 0 in the other half-plane. The slope $\alpha$ of the straight line 221 can be varied as desired over 360° by the values of the resistors 219 and 220 and the manner to supply the comparator 218. Consequently, the outputs for the $f_x - f_y$ plane divided into $2n$ regions can be provided by arranging in parallel $n$ in number of the apparatuses of FIG. 6. That is, this output is a code indicating not the magnitude of the vector $\vec{V} = (f_x, f_y)$ but the argument thereof.

Thus, by being processed by the apparatuses 202 to 206 in FIG. 1 the original image $f$ is transformed into a coded image indicating the argument.

Figure 8A:
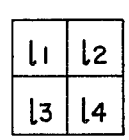
FIGS. 8a and 8b are diagrams showing an example of the micro-regions.
Figure 8B:
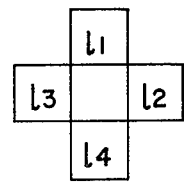
Figure 9:
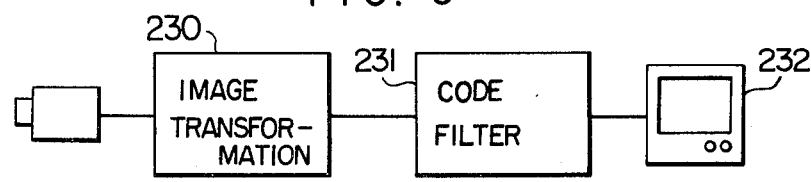
FIG. 9 is a diagram for explaining the display of the characteristic part.

In this embodiment the micro-regions are assumed to be $3 \times 3$ regions. However, it is unnecessary to be made into $3 \times 3$ regions. As is evident from the above description, since the necessary information is variations in brightness in two directions independent of each other, the rates of change in brightness $f_x$ and $f_y$ may be made, as shown in FIGS. 8a and 8b.

$$f_x(x, y) = (l_2 + l_4) - (l_1 + l_3)$$
$$f_y(x, y) = (l_3 + l_4) - (l_1 + l_2) \quad (6)$$

or $$f_x(x, y) = l_2 - l_3$$
$$f_y(x, y) = l_4 - l_1 \quad (7)$$

Since at the point at which the change in brightness is low the value of the directional code scatters under the influence of noise, the magnitude of the vector $\vec{V}$ is defined, for example, as $|\vec{V}| = \text{Max}(f_x, f_y)$. Then, if a circuit which produces a signal indicating the absence of the direction code is added when the magnitude of the vector $\vec{V}$ is smaller than a predetermined magnitude, the influence of noise can be neglected.

A pattern feature extracting system utilizing the system according to the present invention will next be described. Here, it is assumed that the original image in terms of brightness has been transformed into a pattern of the code indicating the direction of the change in brightness by the image transforming apparatus.

If a code filter 231 which is 1 for a specified code and 0 for the other codes is connected to an image transforming apparatus 230 in the succeeding stage thereof, and if the output of the code filter 231 is connected to a monitoring television 232, only the boundary part oriented in a particular direction in the pattern can be relieved or "embossed". This corresponds to the extraction of only a featured or characteristic part from the pattern. It is needless to say that such a code filter 231 can be easily formed by a logical circuit. If the monitoring television 232 is replaced by a counter to count suitable sampling pulses synchronizing with the television scanning only when the output of the code filter 231 is 1, the value proportional to the entire length of the boundaries in that direction is counted.

Figure 10:
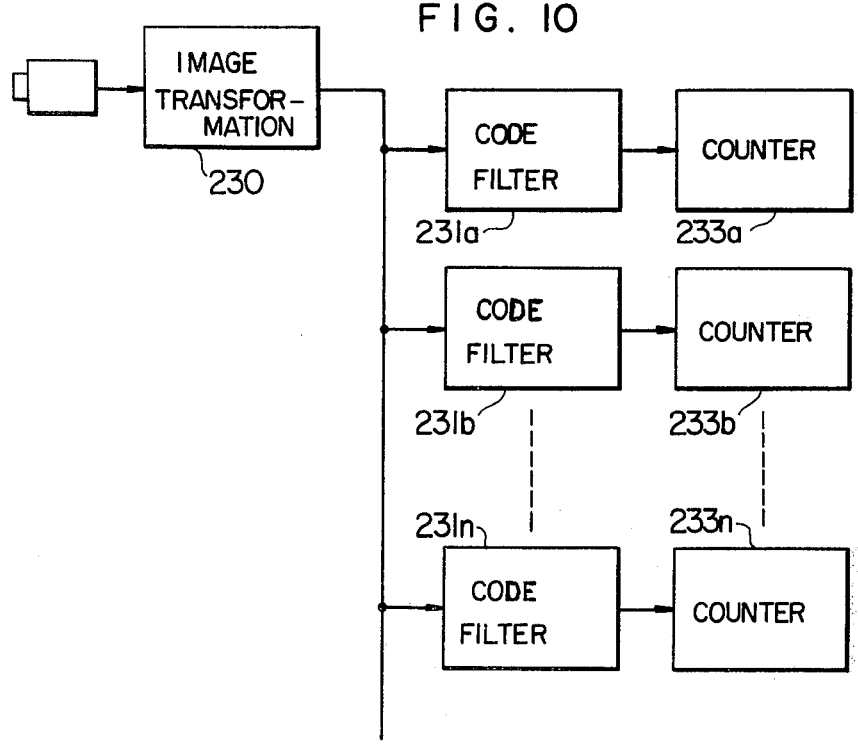
FIG. 10 is a block diagram of the feature extracting circuit.

For example, it is also simple to obtain the value proportional to the length of the oblique line of the character A. If, as shown in FIG. 10, a plurality of such code filters 231a to 231n and counters 233a to 233n are connected so that the number of the picture elements on the longitudinal boundaries, the number of the picture elements on the transverse boundaries, the number of the picture elements on the oblique boundaries and the like are counted, respectively, a simple pattern feature extracting apparatus can be formed as it is because the set of those values represents the characteristic feature of the pattern. Also, if, dividing the image plane into a number of miniature regions (which may be overlapped), similar arrangements are made, a higher degree of feature extracting apparatus can be formed because the feature extraction can be made for each region. According to this scheme the fact that there is a positive slope or a right upturned brightness boundary in the left half of A, for example, and a negative slope or a right turned down brightness boundary in the right half thereof can be extracted as a feature.

An image can be transformed into a multidimensional characteristic vector by the above-described characteristic feature extracting apparatus. Consequently, a simple pattern recognition apparatus can also be formed by adding a means for comparing with a plurality of preset standard vectors similarly in the arrangement in a conventional pattern recognition.

Figure 11A:
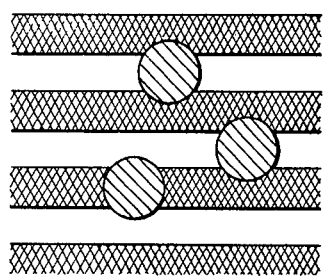
FIGS. 11a and 11b are explanatory diagrams of the congestion measuring apparatus.
Figure 11B:
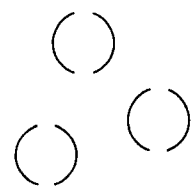

Also, the background can be blanked from the image so far as it is a simple one. FIG. 11a shows grey circles riding on background horizontal stripes. This image is first subjected to a transformation by an image transformation system according to the present invention. Next, it is passed through such a code filter that makes the code indicating the horizontal boundary and the part absent from any code 0 and makes the other code 1. Then, the image as shown in FIG. 11b results. This means that the unnecessary background is blanked.

If a counter is connected to the output of the code filter to count the area of the part 1, the entire length of the boundaries of the circles can be measured. This is also a quantity indicating the number of objects. Consequently, this is also usable as an apparatus for knowing roughly and automatically the number of known objects distributed appropriately in a simple known background. For example, it can be used as a congestion measuring apparatus which measures the number of people present in a hall or square roughly and automatically and supplies information for guiding and controlling the people.

Next, a pattern recognition system utilizing the above-described image information processing system capable of determining the proportion of occupation by an object within a field of vision will be described.

In the recognition system according to the present invention the image plane is divided into a number of micro-regions, the image information of the background is transformed into information substantially invarient in the brightness and is stored in accordance with the unit of the micro-region, and a currently supplied image of the image plane for example with an object therein, and the stored information are successively compared. The proportion of occupation by an object in the field of vision of the image plane is detected from the number of the micro-regions for which the result of the comparison shows disagreement. If the image pick-up device of this recognition system is installed on the ceiling or wall of a hall of a building, for example, the rough number of people getting in the field of vision, i.e. the degree of congestion can be measured since the background is coded in advance by the unit of the above-described micro-region and stored. Consequently, by utilizing the output signal thereof for input information for group control of elevators or lifts an effective operation of the elevators with reduced waiting time is possible.

In this case, the image of the background to be stored in advance may be the brightness information itself. However, since it is inevitable that the image differs between in the daytime and at night, it is preferable that the image of the background is transformed into information substantially invariable in the brightness such as the direction of change in the brightness as will be described below.

It is also possible to update or renew the memory of the background several times a day during anticipated idle time bands of elevators confirming that no call button is pushed. It is also possible to update the memory of the background by detecting that the image is almost invariable during a predetermined time interval (for example, for 5 minutes) or during a predetermined number of processing (for example, 100 times). By doing this relatively new background information (background information in the relatively near past) can be used. Thus, it is unnecessary to consider the difference in brightness in the daytime and in the evening so that the brightness information can be utilized as it is to reduce the necessity of transforming the image information of the background into information invariable in brightness.

As examples of other applications of the present invention, loose articles in production processes can be counted and measured, a feeder of small articles can be monitored to be warned or interrupted in its operation when the articles are absent, the rough number of blood corpuscles can be counted, and a fault such as stains of even an object having a pattern can be detected.

Figure 12:
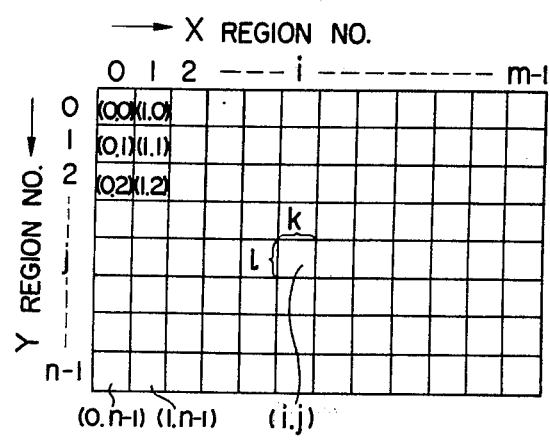

FIG. 12 is a diagram for explaining the principle of the pattern recognition system according to the present invention and shows schematically the picture plane to be picked up by an image pick-up device. It is assumed that the picture plane is scanned, similarly to an ordinary television scanning, from left to right in horizontal directions (X-directions) and from above to below in vertical directions (Y-directions). The picture plane is divided into $m \times n$ micro-regions with $m$ in the X direction and $n$ in the Y direction as shown in FIG. 12. These micro-regions will hereinafter be referred to as blocks. It is unnecessary for these blocks to be the same over the entire picture plane, but may be varied as desired. However, here it is assumed that they are all the same for the sake of simplicity in the sense of circuitry.

It is assumed that one block $(i, j)$ consists of $k \times l$ picture elements with $k$ in the X direction and $l$ in the Y direction. In the present invention one of the $m$ regions in the X direction is selected and processed during the time that the picture plane is scanned once, i.e. during one frame period. Consequently, at No. 0 frame $n$ blocks of X region No. 0 (0, 0), (0, 1), (0, 2), . . . . , (0, $n$-1), i.e. the vertical band region is selected and processed, and at No. 1 frame the next vertical band region of $n$ blocks (1, 0), (1, 1), (1, 2), . . . . , (1, $n$-1) is selected and processed. In this manner, the vertical band regions are successively changed-over frame by frame and processed. Consequently, the processing of the entire picture plane is completed in a total of $m$ frames. Taking a practical example for easy understanding, $k$, $l$, $m$ and $n$ are taken to be $k = l = 20$, $m =$ 16 and $n = 12$, that is, one block consists of 400 picture elements and the entire picture plane consists of 192 blocks. Thus, the numbers of picture elements in the X and Y directions are $m \times k = 320$ and $n \times l = 240$, respectively, and hence it is sufficiently realizable even with the interlaceless scanning by an image pick-up device utilizing an ordinary vidicon. Consequently, one frame time can be realized in the field time 1/60 sec. of the ordinary television scanning system including the flyback period. Thus, the processing time of the entire picture plane becomes $(1/60) \times 16 = 0.27$ sec. to enable the recognition of the degree of occupation by an object of the picture, for example the degree of congestion of people within 0.3 sec.

Figure 13A:
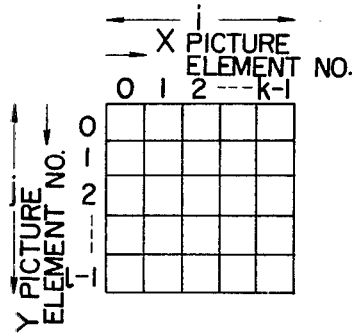
Figure 13B:
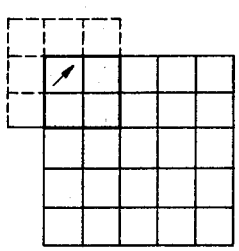
Figure 13C:
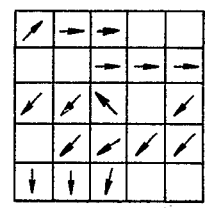

FIGS. 13a to 13c are diagrams for explaining the principle of the recognition system according to the present invention and show one image block $(i, j)$ in FIG. 12. FIG. 13a shows that one block consists of $k$ picture elements in the X direction and $l$ picture elements in the Y direction as has been described above. By utilizing the brightness information of these picture elements the direction of change in brightness can be obtained as a quantity invariant in brightness as described above. A practical method therefor will be described later. Here, the information of two-dimensional region of $3 \times 3$ picture elements including the picture element under consideration is used as shown in FIG. 13b to provide, as the direction of change in brightness at the picture element under consideration, a numerical value indicating the direction such as, for example, the arrow in FIG. 13b. Such a processing is performed picture element by picture element with the advancement of scanning and ultimately the directions of change in brightness at individual picture elements as shown in FIG. 13c can be obtained. The blank picture elements indicate those which are recognized as having only small changes in brightness by subjecting the magnitude of change in brightness to a threshold processing.

The thus obtained directions of change in brightness are classified into eight directions 0, 1, . . . . 7, 7, for example, as shown in FIG. 14a. FIG. 14a indicates that only picture elements around the specified directions are extracted in order to reduce the ambiguity in the direction, while FIG. 14b indicates that each of the picture elements is extracted as one of some direction. Thus, from among the picture elements obtained as shown in FIG. 13c the number of those falling in the directional regions (hatched regions) shown in FIG. 14a or 14b is counted for each direction.

In the above example one image block consisted of $20 \times 20 = 400$ picture elements. If all the directions of change in brightness at these picture elements orient in the direction 5, it is expected that the contents of the counter for counting the direction 5 become 400 and the contents of the counter for counting each of the remaining seven directions become zero. Consequently, if the scales of these counters are made 100, and if they are made to produce an overflow signal when the count exceeds 100, whether a counter produced an overflow signal or not can be regarded as a characteristic feature of the image at the image block corresponding to the counter.

FIG. 15a is an explanatory diagram for regarding the outputs of the counters for the picture elements corresponding to the eight directions as information of 8 bits. In this case, each bit of the information of eight bits (i.e. a byte) corresponds to one of the eight directions. The example of FIG. 15a means that the three counters corresponding to the directions Nos. 0, 5 and 6 have exceeded 100. That is, it is meant that in this image block there are many picture elements whose directions of change in brightness are oriented in the directions Nos. 0, 5 and 6 and there are few picture elements oriented in the directions Nos. 1, 2, 3, 4 and 7 (FIG. 13c). In this manner, in this example the image is expressed by such a characteristic code as taking 1 or 0 depending on whether the numbers of the picture elements in the individual directions are larger or smaller than a certain threshold value.

This characteristic code is one in number per image block. In this example the characteristic code is of 8 bits (one byte). Consequently, there are 192 characteristic codes, that is, the information is of 1536 bits or 192 bytes for the entire picture.

The memory of the background image in this system is very easy by the use of a shift register of a small memory capacity formed of an integrated circuit. The comparison between the characteristic code of the background and the characteristic code of the image actually picked up is carried out by successively changing over the vertical band regions on the picture plane over a plurality of frames as described above. If objects get in the field of vision, some of the image blocks become out of agreement with the characteristic codes of the background stored in advance depending on the sizes, positions and the number of the objects. Consequently, by counting the number of the blocks out of agreement with the characteristic codes over the entire picture the degree of occupation by the objects of the picture plane can be recognized.

Although in the above description the overlow values or the threshold values of the counts for the picture elements in various directions are made the same, 100, they may of course be diversified in various directions depending on the properties of the background such as the presence of vertical stripes, cross stripes, etc.

FIG. 15b shows another example of the characteristic code. Here, a total of three bits of bit Nos. 7, 6 and 5 represents the direction in which the number of the picture elements is largest (in this case direction No. 5) in a binary code, a total of the remaining five bits of bit Nos. 4 to 0 represents the number of the picture elements oriented in that direction. (In this case $2^{2+\alpha} + 2^{3+\alpha} + 2^{4+\alpha}$ ($\alpha$ is a whole number) is represented. That is, the information of 5 bits from the most significant bit counted in a binary number is represented. Considering that one block consists of 400 picture elements and if the case in which all the picture elements have the same direction is considered, $\alpha$ becomes $\alpha = 4$. That is, bit No. 4 indicates the digital place of $2^8$ and bit No. 0 indicates the digital place of $2^4$.) Also, as this characteristic code sequential number the brightness information can be utilized. For example, the difference information between the mean brightness over the entire picture plane and the brightness of the corresponding block may be set in the places of bit Nos. 4 to 0.

Based on the above-described principle a practical structure of the recognition system according to the present invention will now be described.

Figure 16:
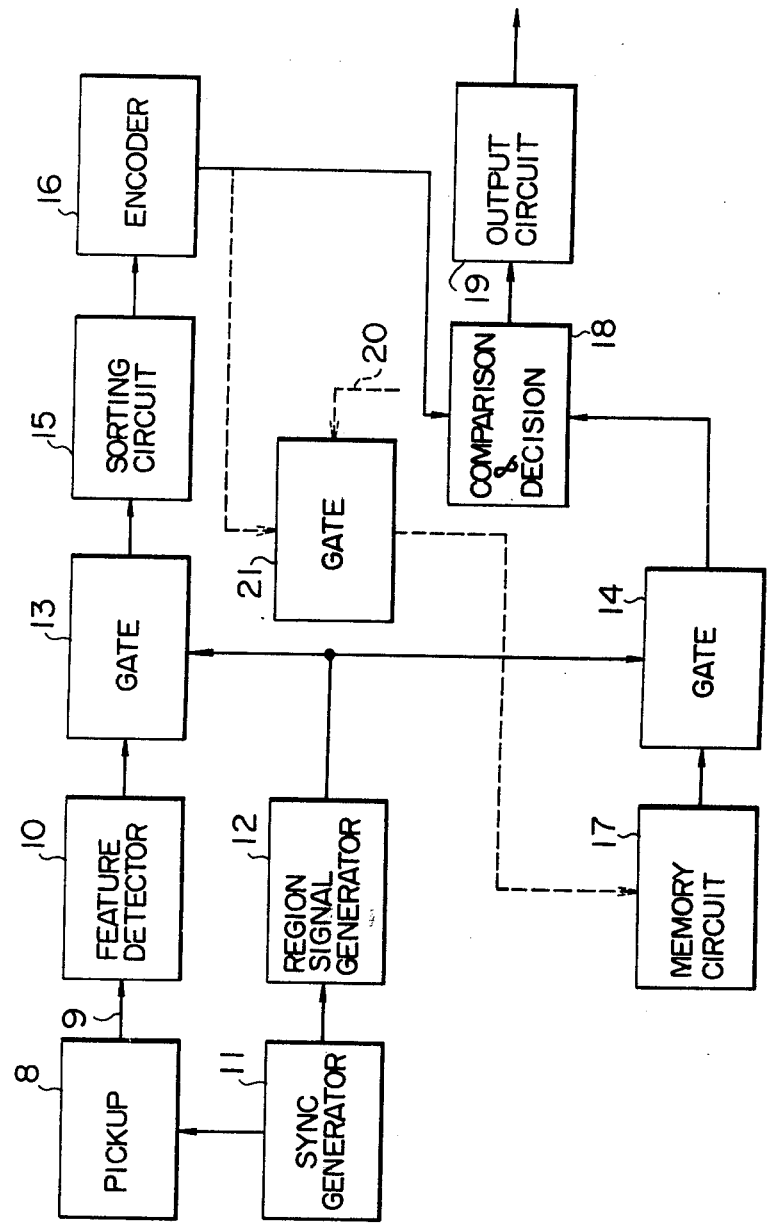
FIG. 16 is a block diagram of the recognition system according to the present invention.

FIG. 16 is a block diagram of the fundamental structure of the recognition system. An image signal 9 from an image pick-up device 8 is supplied to a characteristic feature detecting circuit 10 at which it is converted into a signal indicating the direction of change in brightness as already described, for example. The image pick-up device 8 is driven by a horizontal (X) synchronizing signal and a vertical (Y) synchronizing signal from a synchronizing signal generating circuit 11. A region signal generating circuit 12 is also driven by the synchronizing signal generating circuit 11 synchronously with its output to provide gate circuits 13 and 14 with region signals. The gate circuit 13 passes, among the characterized output of the characteristic feature detecting circuit 10 successively produced with the scanning of the image, only one for a certain region to a classifying or sorting circuit 15. The result of the classification effected by the sorting circuit 15 is supplied to an encoding circuit 16 to be transformed into a code as described above.

The gate circuit 14 passes the characterized code signal of the background stored in a memory circuit 17 to a comparison and decision circuit 18. That is, the gate circuit 14 passes the stored information at the picture position corresponding to the code signal produced by the encoder circuit 16 successively synchronously with the scanning of the picture plane. Consequently, the comparison and decision circuit 18 compares successively the characteristic code for each micro-region produced every moment from the image signal from the pick-up device with the stored characteristic code at the corresponding micro-region and counts the number of the agreed regions to produce an output as the result of decision over the entire picture plane. This output is transformed into a usable form of signal by a signal output circuit 19 as a final output. To supply the background information to the memory circuit 17 the output of the encoder circuit 16 is transferred to the memory circuit 17 by opening a gate 21 by a memory instruction signal from a man or produced automatically.

To control the above-described system according to the present invention various timing signals based on the above-described principle are necessary. Practical structures of the system according to the present invention will be successively described below. However, as preliminaries thereto some main timing signals will first be described.

Figure 17:
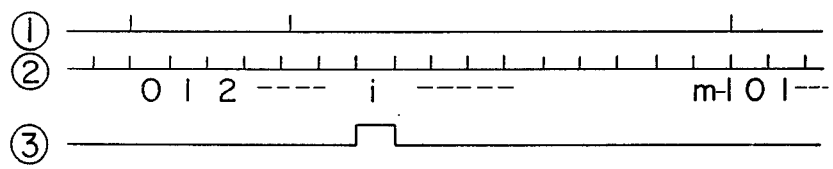
FIGS. 17 to 21 are diagrams illustrating mutual relationships between fundamental signals used for the drive and control of the system according to the present invention.

FIGS. 17 to 21 show these signals which are to be contrasted to FIGS. 12 and 13a to 13c. The signal ① in FIG. 17 is a pulse signal produced at every m frames. This signal is formed by counting the signal produced at every frame, for example the Y synchronizing signals ② m in number. The counter therefor is constructed such that it produces the output pulse ① at the instant the contents of the counter become m and at the same time it is reset to 0. Also, from the contents of the counter at this time a signal becoming logically 1 only during an arbitrary frame i such as the signal ③ can be easily produced. In FIG. 17, as described above, the pulse interval of the signal ① is the unit of the output as the result of one processing. That is, the processing of the entire picture plane is completed in an m frame time (when $m = 16$, this is about 0.3 sec.).

Figure 18:
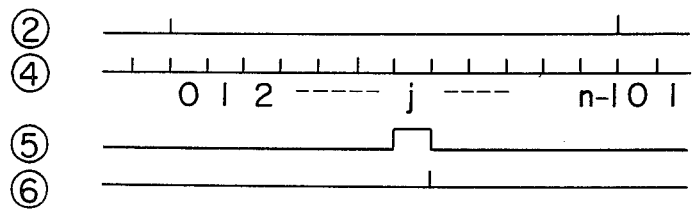

FIG. 18 is an enlargement of a part of the signal ② in which one frame time i is divided into n parts. This is realized by such a counter as counts pulse signals 4 and when the count reaches n, it produces a pulse and at the same time it is reset. The signal ④ corresponds to a signal produced at a boundary of vertical blocks of the image shown in FIG. 12. Also, it is easy to produce a signal ⑤ which becomes logically 1 only when the j-th horizontal band region in the Y direction, for example, is being scanned from the signal (4) and further it is also easy to produce a signal (6) as its trailing edge signal.

Figure 19:
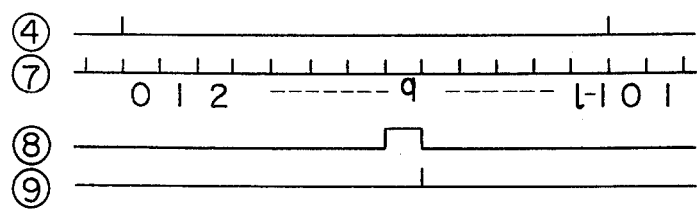

FIG. 19 is an enlargement of the signal (4) in FIG. 18. Since the signal (4) consists of *l* horizontal scanning lines as shown in FIG. 13, it is realized as the output of a counter which counts the horizontal (Y) synchronizing signals (7) *l* in number and is reset. At this time, it is easy to produce a signal (8) which becomes 1 only at the scanning time of any raster (horizontal scanning line) and its trailing edge signal (9).

Figure 20:
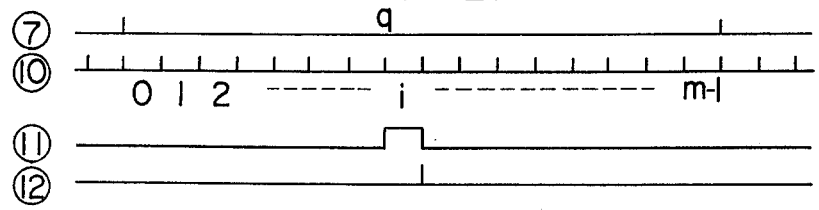

FIG. 20 is an enlargement of the signal (7) in FIG. 19. The signal (7) which represents a horizontal scanning line can be realized as the output of such a counter as counts the signals (10) produced at boundaries in the X direction of blocks in FIG. 12 *m* in number and is reset since the image is composed of m blocks in the horizontal direction as shown in FIG. 12. At this time, it is easy to produce a signal (11) which becomes logically 1 only when the *i*-th vertical band region in the X direction in FIG. 12 is being scanned. Also, its trailing edge signal 12 can be easily produced by differentiating the signal 11.

Figure 21:
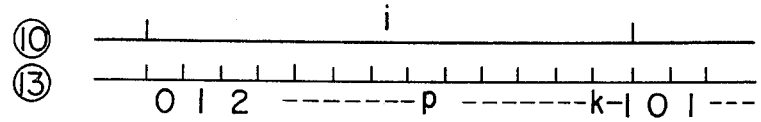

FIG. 21 is an enlargement of the signal (10) in FIG. 20. As is shown in FIGS. 13a to 13c, the width of the block in the X direction corresponds to k picture elements. Consequently, the signal (10) can be realized as the output of a counter which counts *k* picture element pulses (13) and is reset.

As is evident from the above description, if a picture element pulse generator is provided, all necessary control signals can be produced by successively counting pulses produced by the picture element pulse generator by some number of counters.

Figure 22:
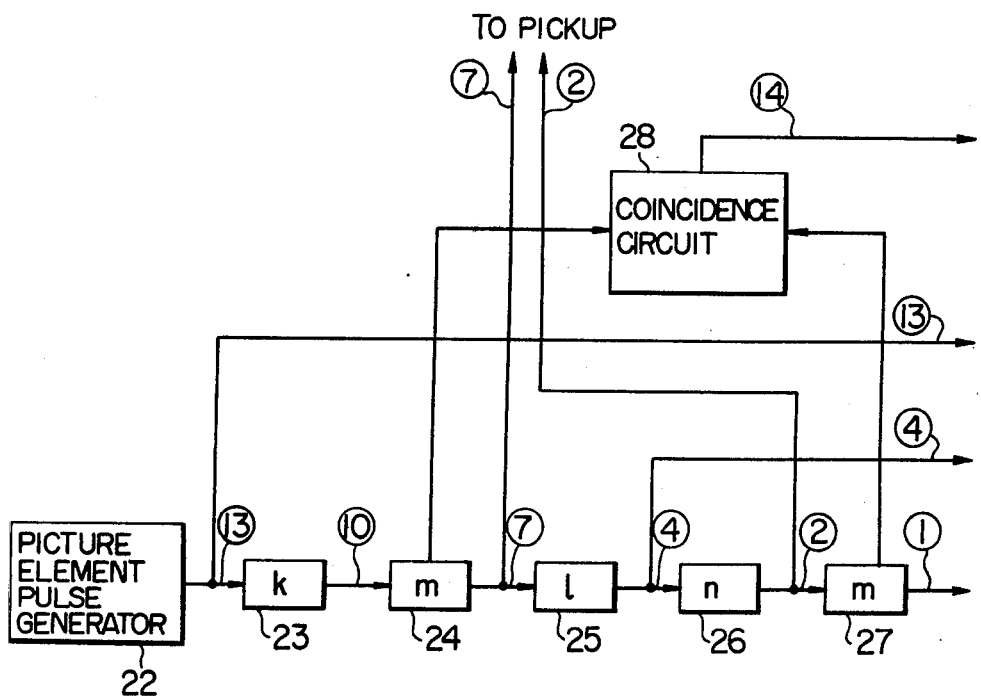
FIG. 22 is a block diagram of the synchronous signal generating circuit and the region-signal generating circuit in the system according to the present invention.

FIG. 22 shows practical structures of the synchronizing signal generating circuit 13 and the region signal generating circuit 14 of the system of FIG. 16 constructed based on the above idea. If the pulse signal (13) produced by a picture element pulse generator 22 is successively counted by a counter 23 which counts *k* in number and is reset, a counter 24 which counts *m* in number and is reset, and similar counters 25, 26 and 27, the signals illustrated in FIGS. 17 to 21 can be obtained.

Here, the signals (7) and (2) from the counters 24 and 26 are X and Y synchronizing signals supplied to the image pick-up device 8. Now, a coincidence circuit 28 is provided to compare the contents of the counter 24 with the contents of the counter 27 so that only when the two agree with each other, a logically 1 signal (14) is produced. This signal corresponds to the AND output of the signal (13) in FIG. 17 and the signal (11) in FIG. 20. Consequently, at the 0 frame the signal (14) becomes logically 1 only when the left and vertical band regions (0, 0), (0, 1), . . . , (0, *n*-1) in FIG. 12 are being scanned, and at the 1st frame only when the next vertical band regions (1, 0), (1, 1), . . . . , (1, *n*-1) are being scanned. That is, generally at the *i*-th frame it becomes 1 only when the band regions of region No. *i* in the X direction (*i*, 0), (*i*, 1), . . . . , (*i*, *n*-1) are being scanned.

Consequently, for *m* frames of from No. 0 to No. *m*-1 the band regions are selected successively from the left end and reach the right end with m frames. Thus, the signal (14), the picture element pulse signal (13), the horizontal synchronizing signal (4) corresponding to boundaries of vertical blocks of the image, and the signal (1) corresponding to the boundary of one period of processing are produced and used as practical control signals for the circuit described below.

Figure 23:
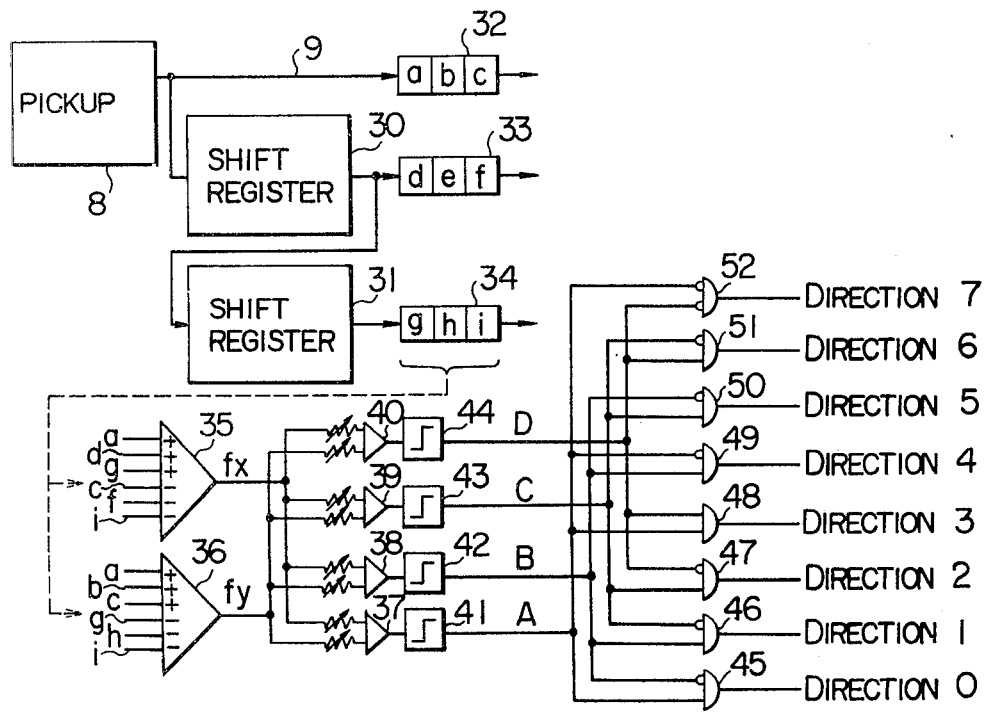
FIG. 23 is a diagram of the characteristic feature detecting circuit in the system according to the present invention.

FIG. 23 is a practical structure of the characteristic feature detecting circuit 10 in the image processing system according to the present invention shown in FIG. 16. An image signal 9 from the image pick-up device 8 is supplied to a shift register 30 which stores information for one horizontal scanning line. The shift register 30 may be a semiconductor shift register or may be an electromagnetic delay line. More preferably, it may be an analog memory of a shift type. The output of the shift register 30 is supplied to another shift register 31. By this construction, the information at the scanning line before one line and the information at the scanning line before two lines can be provided as outputs of the shift registers 30 and 31, respectively, in addition to the present image signal 9. These three signals are supplied to shift registers 32, 33 and 34. Each of these three shift registers have a capacity or depth of 6 bits so that it can store information of three picture elements. That is, in the shift register 32, for example, the information is successively shifted from *a* to *b*, from *b* to *c*, and then it is discarded from *c*. Consequently, the newest information is present at *a*, *b* is occupied by the information of the picture element before one, and *c* is occupied by the information of the picture element before two. These pieces of information are updated successively.

Consequently, a total of nine pieces of information *a*, *b*, *c*, *d*, *e*, *f*, *g*, *h* and *i* are image values in the two-dimensiona regions of 3 × 3 on the picture plane as shown in FIG. 13*b*. Since these are updated successively with the scanning, always 3 × 3 image values are provided as if the picture plane is being successively scanned through a 3 × 3 two-dimensional window. If these image values *a* to *i* are converted into analog quantities, for example, and supplied to adders 35 and 36 as shown in FIG. 23, the adders 35 and 36 produce the outputs $f_x$ and $f_y$, respectively, $$f_x = (a + d + g) - (c + f + i)$$
$$f_y = (a + b + c) - (g + h + i)$$

which represent the rate of change in brightness more or less averaged in the X direction and that in the Y direction, respectively. If $$\theta = \tan^{-1} \frac{f_y}{f_x}$$

is calculated from two pieces of information $f_x$ and $f_y$, this can be regarded as the direction of change in the brightness in the two-dimensional region in question.

Figure 24A:
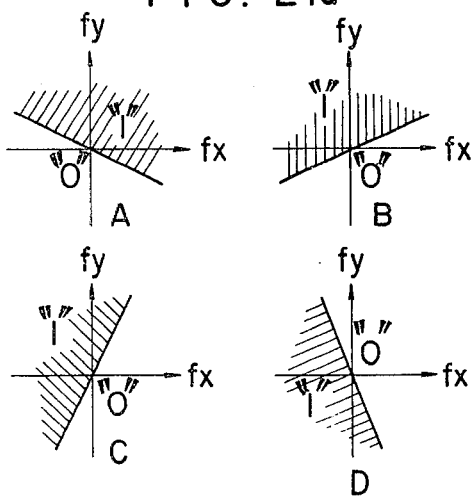
FIGS. 24a and 24b are diagrams for explaining the principle of the detecting circuit of FIG. 23.
Figure 24B:
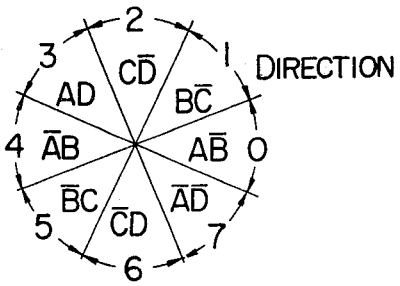

To calculate the angle $\eta$, an arctangential calculation is generally inconvenient. Hence, as shown in FIG. 23, four adders 37, 38, 39 and 40 are provided to which $f_x$ and $f_y$ are supplied through respective coefficient or constant multipliers (resistors). That is, $$pf_x + qf_y,$$

where *p* and *q* are coefficients is calculated in each adder. This value becomes 0 on a straight line passing the origin of the $f_x - f_y$ plane as shown in FIG. 24*a* the slope of which can be arbitrarily selected over 360° by selecting the values of *p* and *q* and the (positive and negative) sign of the input. Consequently, by selecting appropriately the inputs of the adders 37 to 40 in FIG. 23 the straight lines in the four directions shown in FIG. 24*a* can be obtained. Now, if binary encoding circuits 41 to 44 are provided next to the adders 37 to 40 in FIG. 23, they produce such binary outputs as become 1 when $pf_x + qf_y$ is positive and 0 when it is negative. This means that the hatched parts in FIG. 24*a* are 1, and the non-hatched parts are 0. Consequently, if four adders 37 to 40 are selected as shown in FIG. 24a, the direction is determined from the combination of outputs A, B, C and D of the binary digitizer circuits 41 to 44. That is, the direction 0 is the region at which A is 1 and B is 0, that is, when A·$\overline{B}$ is 1; the direction 5 is when B is 0 and C is 1, that is, when B·$\overline{C}$ is 1 as shown in FIG. 24b. Consequently, the signals of the direction Nos. 0 to 7 can be obtained by providing eight logical circuits 45 to 52 which perform eight logical operations shown in FIG. 24b.

Then, when a group of picture elements are present in the shift registers 32, 33 and 34, one of the logical circuits 45 to 52 becomes 1 and the remaining circuits become 0. Consequently, with the advancement of the scanning the direction of change in brightness is detected picture element by picture element. This information corresponds to the direction division shown in FIG. 24a. To make directional division as shown in FIG. 24a it is sufficient to double the number of the adders 37 to 40 in FIG. 23 and to take the logic of the binary outputs thereof so that the number of straight lines as shown in FIG. 24a is made eight. If both $f_x$ and $f_y$ are of small values, it is better to make directionless rather than forcibly allot the direction code. That is, the reliability increases if it is made a blank picture element (the picture element whose direction is not detected so that it is decided as having no change in brightness as shown in FIG. 13c.

For this purpose, for example the absolute values of $f_x$ and $f_y$ are produced by absolute value circuits (rectifying circuits), the sum of the absolute values is produced by an adder, and whether the sum is less than a constant value $\epsilon$ or not, that is, whether the relation $|f_x| + |f_y| < \epsilon$ stands or not is decided. Then, it is sufficient to provide such a binary digitizer circuit as producing an output 1 if the sum is larger than $\epsilon$, and to provide such a gate circuit as producing a direction code only when the output of the binary digitizer circuit is 1 to each of the outputs of the circuit of FIG. 23. According to this configuration, if each change in brightness of all directions from No. 0 to No. 7 is less than the predetermined value no output can be produced from the gate circuit. The fact that the case in which the variation in the image is small is excluded corresponds to the exclusion of a certain region around and including the origin in FIGS. 14a and 14b.

Figure 25:
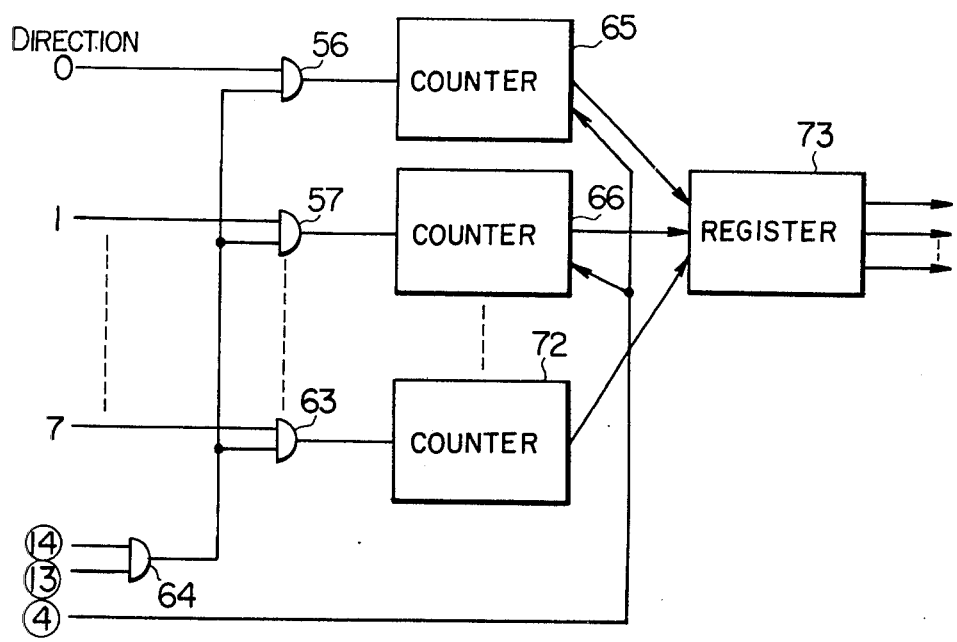
FIG. 25 is a block diagram of the classifying or sorting circuit and the encoder circuit in the system according to the present invention.

FIG. 25 is an example of the practical structure of the gate circuit 13, the sorting circuit 15 and the encoding circuit 16 in the system of FIG. 16. The outputs, i.e. the signals of the directions Nos. 0 to 7 produced by the characteristic feature detecting circuit 10 in FIG. 16 described referring to FIG. 23 activate gate circuits 56, 57, . . . , 63 to pass the AND output of the signals ⑬ and ⑭ supplied by a gate circuit 64, i.e. picture element pulses when scanning the i-th vertical band region of the i-th frame to counters 65 to 72. Consequently, only the counter corresponding to a certain direction out of eight counters 65 to 72 is supplied with 1.

In this manner the picture element pulses at the band region under consideration are distributed to the counters 65 to 72 depending on the states of the directions Nos. 0 to 7. Since these counters are reset by the signal④, i.e. the horizontal scanning signal indicating the boundary between the blocks in the Y direction, the counters always begin counting from this boundary and divide the i-th vertical band region which is the object to be processed into n pieces to provide successively the results of the counting at individual blocks.

The counters 65 to 72 count, as the principle thereof has been described, up to the value of a fraction of the total number of picture elements in the blocks. For example, when one block consists of 20 x 20 = 400 picture elements, they count up to, say, 50 or 100. If the count exceeds this value, an overflow signal is produced to set the corresponding bit of a register 73 to 1. By doing like this, the register 73, consisting of 8 bits in this case, is set to 1 only at the bit of the direction having a larger number of picture elements than a predetermined value as shown in FIG. 15a. Consequently, the content of this register 73 is the characteristic code at its block. The content of this register is reset after being compared with the characteristic code stored in advance by the circuit described below, by the signal④ which is somewhat delayed to be prepared for the encoding in the next block.

When the characteristic code shown in FIG. 15b is adopt, a maximum value detecting circuit monitors the counters 65 to 72 to detect the sequence number of the counter counting the maximum value and its content. The sequence number is supplied to the register 73 after being coded by an encoder and the content is, as it is, or a higher significant digit is supplied to another bit position of the register 73.

Figure 26:
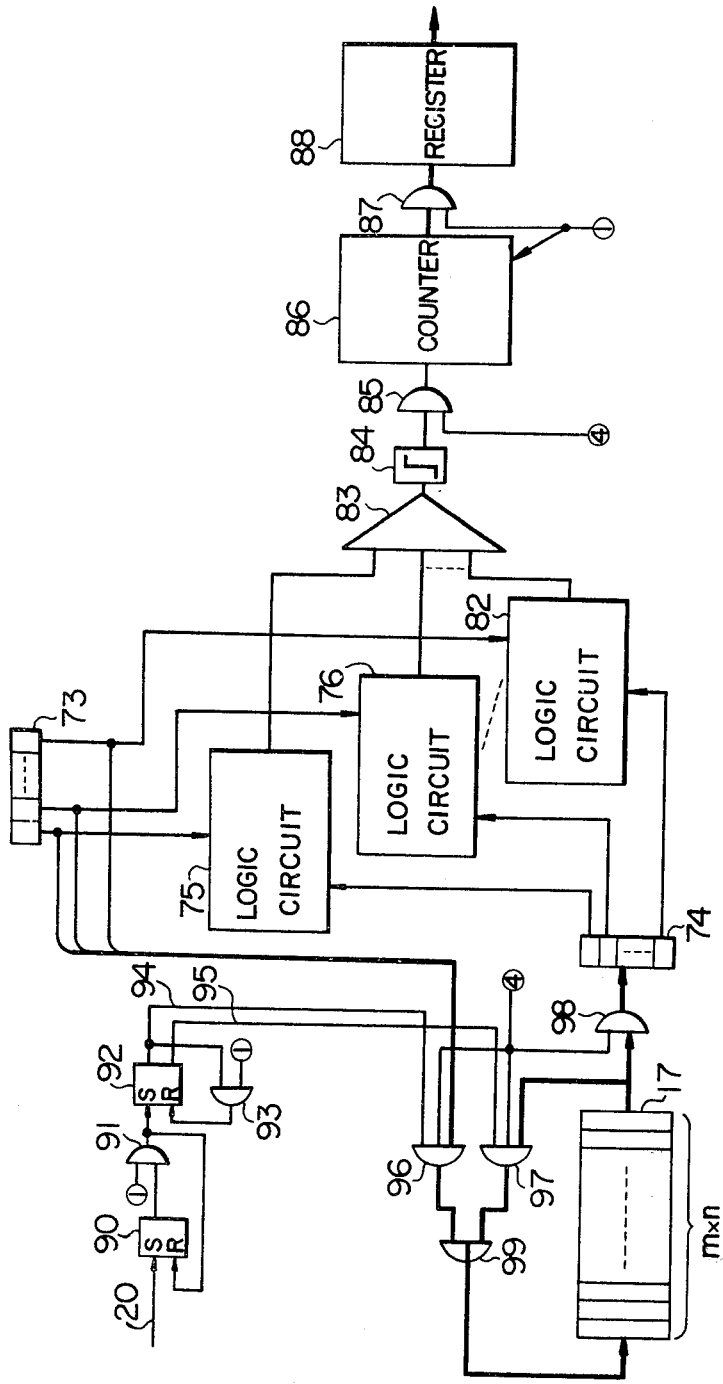
FIG. 26 is a constructional diagram of the memory circuit and the comparing circuit in the system according to the present invention.

FIG. 26 is a practical embodiment of the memory circuit 17, the gate circuit 14, the comparison and decision circuit 18 and the gate circuit 21 in the system of FIG. 16. The code output of the register 73 described referring to FIG. 25 is compared with the characteristic code read out from the memory circuit consisting of, for example, a shift register in a register 74. In this example, exclusive logical sums for respective bits are formed by logical circuits 75 to 82 and the output voltage corresponding to the number of incoincident bits is provided by an adder 83. When this output is converted into a binary value by a binary digitizer 84 having a certain threshold value, the output of the circuit 84 is 0 when the coincidence stands to a certain extent, otherwise it is 1. This means that by establishing the threshold value a certain degree of coincidence is regarded as perfect coincidence. If the threshold value is 0, the signal becomes 1 without fail except when the coincidence is perfect.

Since, at any rate, the output of the binary digitizer circuit 84 becomes 1 when both characteristic codes, i.e. the contents of the registers 73 and 74 are not in coincidence, a gate circuit 85 passes the signal④ at the boundary of blocks in the Y direction (actually, a signal more or less delayed in time) to supply 1 to a counter 86. In other words, the number of blocks which are not in coincidence is counted by adding 1 when the information of block does not agree with the stored one.

By being done like this, the number of the blocks which are not in agreement in the entire picture plane has been counted by the counter 86 when the processing of the entire picture plane is completed with $m$ frames of from the 0 to the ($m$-1)th, that is, when the signal①is produced. Consequently, the content of the counter 86 is transferred to a register 88 through a gate 87 by the signal 1 and at the same time the counter 86 is reset to be prepared for the measurement in the next cycle. Consequently, in the register 88 there is always information of the number of the block is disagreement (i.e. the degree of occupation by the object) though they are updated at every $m$ frames.

On the other hand, when a memory instruction signal 20 is supplied, a flip-flop circuit 90 is set to 1 to supply the signal ① at the breakage of processing through a gate 91 to a flip-flop 92 to set it. At the same time, the flip-flop 90 is reset, so that the succeeding signal ① is not supplied to the flip-flop 92. However, if the flip-flop circuit 92 is set to 1, it resets itself by the pulse of the next signal ① through a gate circuit 93. Consequently, one output 94 of the flip-flop circuit 92 is such a signal as becoming 1 only at one complete processing cycle (i.e. m frames) immediately after the appearance of the memory instruction signal 20, while the other output 95 of the flip-flop circuit 92 is the negation of the output 94 and becomes 1 outside the one processing cycle. Consequently, during one processing period immediately after the appearance of the memory instruction a gate circuit 96 is opened and a gate circuit 97 is closed, while outside that period the gate circuit 96 is closed and the gate circuit 97 is opened. When the gate circuit 97 is opened, the content of the memory circuit 17 is shifted one by one by the signal ④ at the breakage or boundary between blocks, and the output of the memory circuit 17 is set in a register 74 through a gate circuit 98 and at the same time returned to the original position in the memory circuit 17 through the gate circuit 97 and an OR circuit 99. Thus, the memory circuit 17 is, for example, a ring dynamic shift register which stores the information of the directions Nos. 0 to 7 in the above example in 8 bits and whose length corresponds to the number of all blocks $m \times n$.

On the other hand, at one processing period immediately after the appearance of the memory instruction the gate circuit 96 is opened so that the characteristic codes as the result of processing for the image under scanning are supplied successively from the register 73 to the memory circuit 17 to update the contents thereof. At the succeeding processing period the gate circuit 96 is closed and the gate circuit 97 is reset to be opened, so that the contents of the memory circuit 17 are again supplied thereto as they are through the gate circuit 97 to maintain the contents dynamic in the memory circuit 17.

Figure 27:
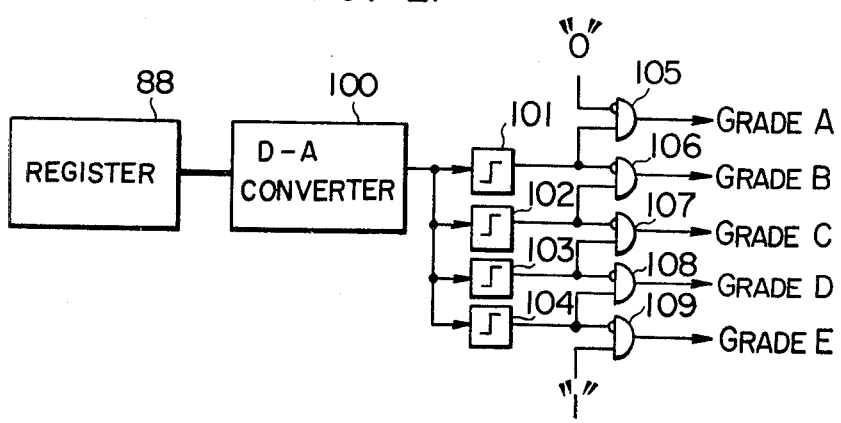
FIG. 27 is a constructional diagram of the signal supplying circuit in the system according to the present invention.

FIG. 27 is an example of the practical structure of the signal output circuit 19 in the system of FIG. 16. As described referring to FIG. 26, in the register 88 the number of the incoincident blocks is set. This information is of course effective even as it is. However, like in the case where the image of people waiting an elevator is picked up obliquely from above for example, there is also the non-linearity due to the overlapping of people. Consequently, for applications to elevators, for example, which do not require the decision of so exact a number of people, it is converted, for example, into an analog quantity by a D-A converter 100 and again digitized by threshold values set at even intervals or set intentionally at uneven intervals.

Binary digitizer circuits 101 and 104 have threshold values descending in order from above. Consequently, uppermost some of the outputs of the binary digitizers 101 to 104 are 0 and some of the remaining lower ones are 1 depending on the contents of the D-A converter 100. Consequently, if the negation of either one of the two is supplied to AND gates 105 to 109 in order to find out the breakage therebetween, an output signal appears on one of the output lines of the AND gates 105 to 109. Thus, the degree of congestion can be indicated in five grades A to E in this example. This signal is updated at every $m$ frames as described above.

Some signal is always produced. Of course it is also possible to re-encode this signal into information of binary 3 bits, for example, and to supply it in a compressed form.

Figure 28:
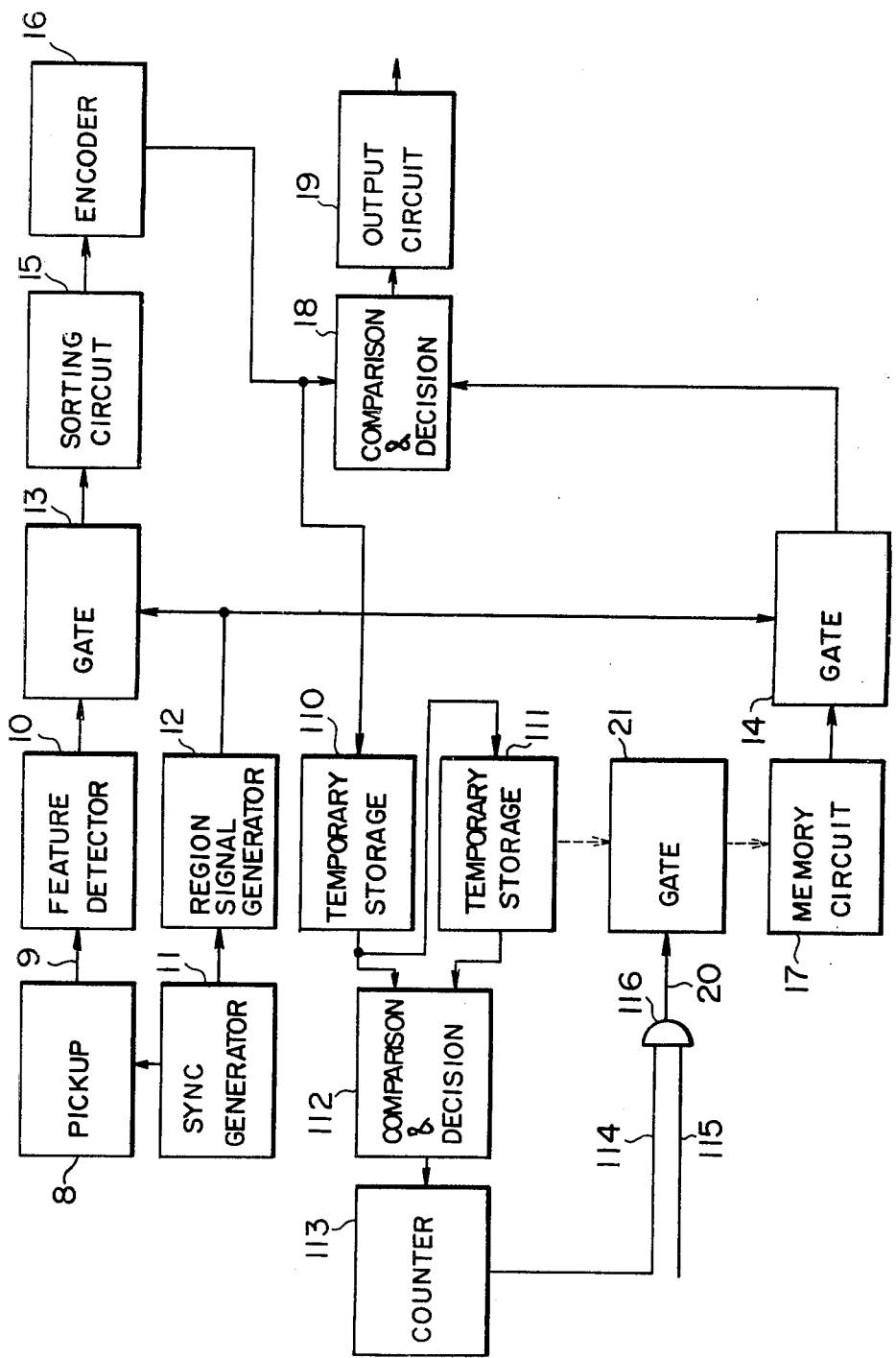
FIG. 28 is a block diagram of another embodiment of the recognition system according to the present invention.

FIG. 28 is a block diagram of another embodiment of the system according to the present invention. An image signal 9 from an image pick-up device 8 is characterized by a characteristic feature detecting circuit 10 and classified by a classifying or sorting circuit 15 supplied through a gate circuit 13 which is activated by a control signal produced by a synchronizing signal generating circuit 11 and a region signal generating circuit 12, and then is converted into a characteristic code by an encoding circuit 16. This characteristic code is compared with the characteristic code of the background read out from a memory circuit 17 through a gate circuit 14 and decided by a comparison and decision circuit 18 and then released by a signal output circuit 19. These parts are the same as has already been described referring to FIG. 16.

In the system of FIG. 28, however, the characteristic code from the encoding circuit 16 is stored in a temporary storage 110 of, for example, a shift register type capable of storing the information of one picture. This storage can be carried out similarly to that of the memory circuit 17 described referring to FIG. 26. The sole different point is that the storage is always effected one after another in the unit of one processing period independently of the presence of the memory instruction signal.

The contents of the temporary storage 110 are, at the next processing period after the contents of one processing period ($m$ frames) have been supplied, are successively supplied to another shift register type temporary storage 111 and a comparison and decision circuit 112. The comparison and decision circuit 112 having a similar structure to the comparison and decision circuit 18 compares the information before one processing period set in the temporary storage 110 and the information before two processing periods set in the temporary storage 111 and counts the number of the blocks which are not in agreement therebetween. The circuit 112 further has the function to detect that the number of disagreed blocks is zero. This is effected by detecting that the contents of the counter for the number of blocks are 0 when one processing cycle is completed (that is, when the above-described signal ① is produced). If the characteristic codes at all blocks are in agreement, a processing number counter 113 counts the signal ①, produces a pulse output 114 when the contents thereof reach, for example, 100, and reset itself. If the characteristic codes are not in agreement even at one of all blocks, the counter 113 is reset by the signal ①.

Then, the counter 113 is successively supplied with 1 only when the images are in agreement continuously for a certain number of processing cycles. However, if there is even one processing period at which the images disagree, the counter 113 is reset to 0 and the count is repeated again from the first. If the image is the same over consecutive 100 processing periods (that is, 100 × $m$ frame time, for example, in the above example, since $m = 16$ and 1 frame time $= 1/60$ sec., the time period is $100 \times 16/60 = 27$ sec.), the counter 113 produces the pulse signal 114 as an overflow signal and resets itself. This signal 114 functions as the memory instruction signal 20 as shown in FIG. 16 and open the gate circuit 21 to transfer the information temporarily stored in the temporary storage 111 to the memory circuit 17. The manner of this transfer may be similar to that described referring to FIG. 26. Though in FIG. 26 the storage is made waiting the next one complete processing period after the presence of the memory instruction signal, in this example the gate 21 may be opened immediately since the signal 114 is produced at the end of one processing period.

If, in this manner, the fact that the image does not change at a number of consecutive processing periods is detected, it is highly probable that the image includes only the background but not the object. (In this case, since the background information stored in the past is used in the comparison and decision circuit 18, a complete coincidence output is not necessarily produced.) Consequently, the contents of the temporary storage 111 are transferred to the memory circuit 17 regarding them as background information anew. Thereafter, the degree of occupation (degree of congestion) is recognized by the comparison and decision circuit 18 with reference to this fresh information.

The pulse signal 114 produced by the fact that there is no change in the image over a number of consecutive processing cycles becomes more surely the memory instruction signal 20, when the system according to the present invention is utilized as a congestion recognition system for an elevator for example, after a logical product of it and a signal 115 indicating that the calling button of the elevator is not pushed is formed by an AND circuit 116. This is because, if the call button is not pushed and if the image does not change, it is highly probable that the image is an image of the background.

In the above example, the image at the period before one processing period and the image at the period before two processing periods are compared by providing the temporary storages 110 and 111. However, even if the temporary storage 110 is removed and its input and output are connected directly in FIG. 28, all the same function is performed except that the image at the present processing cycle and the image at the cycle before one processing cycle are compared. It is also possible that the memory circuit 17 and the temporary storages 110 and 111 are made to be frame memories to which the image from the image pick-up device is supplied without being subjected to any processing, and when the difference between the preceding frame and the present frame is small over a number of consecutive frames, the image is transferred to another frame memory as the information of the background. In this case, it is sufficient that the image outputs from the frame memories corresponding to the temporary storages 110 and 111 are supplied to a differential amplifier to form a difference signal between the two images which is integrated by an integrator after being rectified by an absolute value circuit, and if the integrated result over one frame is smaller than a certain threshold value, they are regarded as the same image. Also, it is sufficient to seek the area of the part of the picture plane at which the absolute value of the difference between the present image and the image stored as the background is larger than a certain threshold value. For this purpose, the picture element pulses are gated by a signal which becomes 1 when the absolute value of the difference is larger than a certain threshold value to be supplied to the counter.

In the above description it was assumed that the picture plane is divided into $m \times n$ blocks as shown in FIG. 12. In other words, no description is made of the fly-back period of the actual picture pick-up device. This is because an image is regarded as including the blanking part at the fly-back period. That is, the image in FIG. 12 is to be construed as including the blanking period. If it is desired that only the effective image part is divided into $m \times n$ blocks, the structure of FIG. 22 is more or less changed such that a counter which counts the number of picture elements to produce independently an X synchronous signal and a counter which counts the X synchronous signal to produce a Y synchronous signal are additionally provided and connected to the outputs of the counters 24 and 26, respectively, cutting off the outputs of the counters 24 and 26 from the counters 25 and 27. Further, though the counters 24 and 26 were assumed to reset themselves when they have counted to $m$ and $n$, respectively, these functions are nulled and they are assumed to be able to count further. But instead, they are reset by the X and Y synchronous signals from the additional counters, respectively.

In the above description it was assumed that there is no interlacing. This is only the question of how to produce the X and Y synchronous signals. If the synchronizing signal and region signal generating systems in FIG. 22 are appropriately designed, both of the entire plane decision with m fields and the entire plane decision with m frames can be realized.

Also, it was assumed that in deciding the number of the blocks in disagreement is counted. However, since the number of division of the picture plane is known previously, of course the same effect can result by counting the number of the blocks which are in coincidence.

When the system according to the present invention is mounted on the upper part of an elevator to look down obliquely from above, the area which is occupied by a single man in the picture plane is smaller at the upper part of the picture plane which is far from the image pick-up device and is larger at the lower part of the picture plane which is nearer to the image pickup device. In order to compensate for such a nonlinearity to a certain extent to produce a more reliable degree of congestion, the block under consideration is weighted depending on its position. For example, one block in disagreement is counted as regarded as four blocks at an upper part of the picture plane, while at a lower part of the picture plane it is counted as one block as it is.

That is, when the number of the blocks in disagreement is to be counted by the counter 86 in FIG. 26, in addition to the pulse signal 4, for example any one of pulses successively released from a pulse generator which produces two pulses when supplied with one pulse of the signal 4, a pulse generator which produces three pulses, a pulse generator which produces four pulses, etc. each composed of a one-shot multivibrator is gated depending on the position in the picture plane under scanning to be supplied to the gate circuit 85. Alternatively, it may be supplied to the first stage, second stage, third stage, etc. of the counter 86 selectively depending on the position under scanning.

Figure 29:
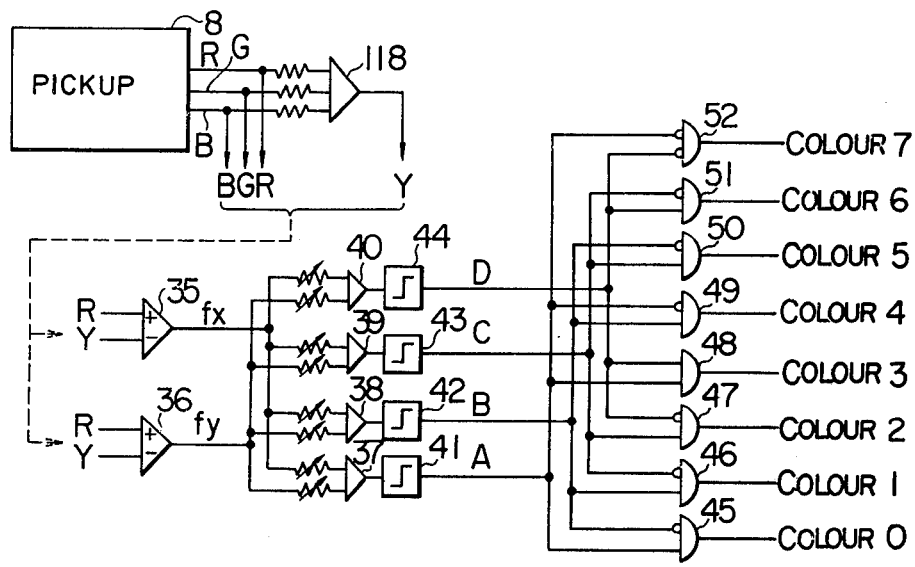
FIG. 29 is a constructional diagram of the characteristic feature detecting circuit in the system according to the present invention.

FIG. 29 is another practical structure of the characteristic feature detecting circuit 10 in the system according to the present invention shown in FIG. 16 or 28. Here, colour difference information is used for the information substantially independent of brightness. That is, the image pick-up device 8 is a colour image pick-up device. Colour signals R, G and B produced by the colour image pick-up device 8 and a luminance signal Y produced by an adder 118 by mixing the three colour signals at a determined proportion are supplied to adders 35 and 36. The latter adders produce successively the colour difference signals $f_x = R - Y$
$f_y = B - Y$ respectively, in accordance with the scanning by the image pick-up device 8.

When the colour difference signals $f_x$ and $f_y$ are represented on the $f_x - f_y$ plane, the colours are separated angularly such that, for example, red is in a certain angular region at the second quadrant, green is in a certain angular region at the third quadrant, and blue is in a certain angular region at the fourth quadrant. Consequently, if the $f_x - f_y$ plane is divided into a number of directional regions based on the principle already described referring to FIGS. 24a and 24b, they represent different colour regions. Consequently, the circuits 37 to 52 in FIG. 29 can be structured all the same as those in FIG. 23. Thus ultimately the colour region can be divided into eight colour regions of colour Nos. 0, 1, . . . , 7 and some one of the eight outputs becomes logically 1 depending on the scanning by the image pick-up device 8. In this case, a region around the origin of the $f_x - f_y$ plane corresponds to white. If this region is intended to be excepted, it is sufficient to mask the outputs with gate circuits by the above-described method provided that the sum of the individual absolute values (or squares) of $f_x$ and $f_y$ does not exceed a certain constant value. By furthering this way of thinking it is possible to encode the radial direction depending on whether the above sum signal exceeds a certain number of constant values or not, thereby enabling to further minutely dividing the $f_x - f_y$ plane.

By utilizing the circuit of FIG. 29 encoding of colours in the above-described image blocks is possible. Consequently, comparing with the previously stored colour code of the background the above-described degree of occupation can be recognized from the change in colour. In FIG. 29 two signals R - Y and B - Y were utilized. However, if a more except quantity invarient in brightness is intended to be used, the R, G and B signals are transformed by a matrix circuit into another colour coordinates X, Y and Z. Then, from $S = X + Y + Z$, which is produced by an adder, and X and Y chromaticities $x = X/S$ and $y = Y/S$ are produced by a divider. Then, the $x$ and $y$ signals are subjected to A-D conversion, for example, to be divided into lattice regions on the $x - y$ plane (chromaticity diagram), and outputs are produced by allotting codes to these regions.

Alternatively, to remove the origin to the white position on the chromaticity diagram such coordinate as the chromaticities $x_o$ and $y_o$ corresponding to white are subtracted from the $x$ and $y$ signals, i.e.

$f_x = x - x_o$
$f_y = y - y_o$ are produced by an adder, and the angular region on this $f_x - f_y$ plane is divided into a number of regions similarly to those described referring to FIGS. 23 and 29.

Figure 30:
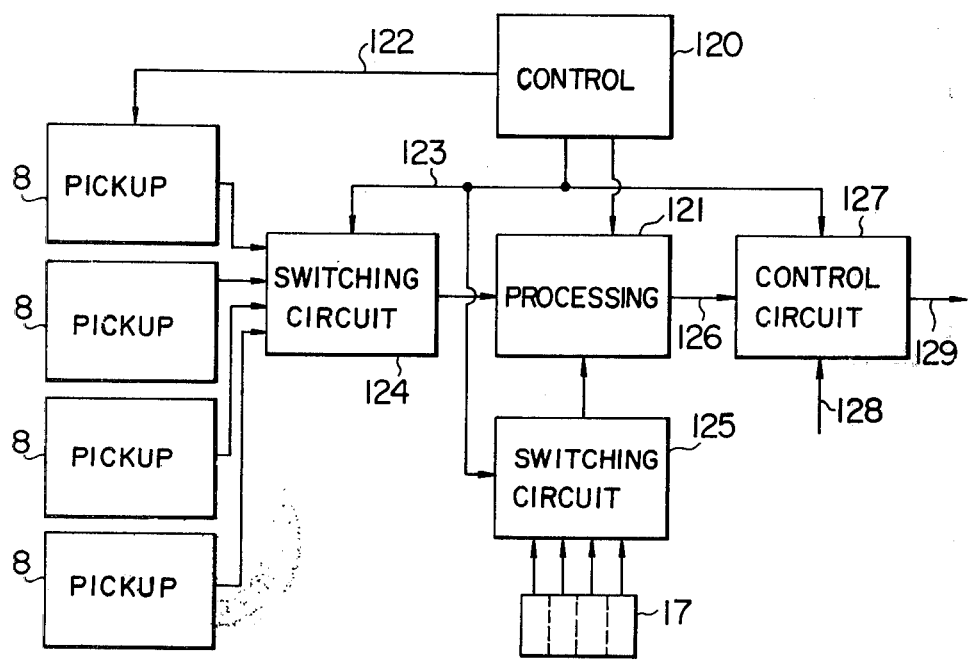
FIGS. 30 and 31 are block diagrams of the entire systems in which the recognition system according to the present invention is practised as the congestion recognition system for controlling a group of lifts or elevators.

FIG. 30 is a block diagram of the whole structure of a congestion recognition system for an elevator system utilizing the system of FIG. 16. A control section 120 corresponds to the synchronizing signal generator 11 and the region signal generator 12 in FIG. 16. A processing section 121 includes the characteristic feature detecting circuit 10, the gates 13 and 14, the sorting circuit 15, the encoding circuit 16, the comparison and decision circuit 18 and the output circuit 19 in FIG. 16.

A plurality of image pick-up devices 8 installed on individual floors or main floors of a building are driven by a synchronizing signal 122 from the control section 120. Image signals from the image pick-up devices 8 are successively changed-over by a switching circuit 124 based on an instruction signal 123 (for example, the above-described signal ① at every m frames) from the control section 120 and supplied to the processing section 121 in such a manner tha the signal from the image pick-up device on certain floor at a certain processing cycle, the signal from the image pick-up device on another floor at another processing cycle, and so on. In this case, the background image signals corresponding to the respective image pick-up devices are stored in a memory circuit 17 in a coded form as described above, which are selected by a switching circuit 125 synchronously with the selection of the image pick-up device based on the switching signal 123 from the control section 120.

In this manner, the image pick-up devices and the stored background information are changed over at every processing cycle, the above-described processing is performed by the same processing section, and the ultimately obtained degree-of-occupation (degree-of-congestion) information 126 is, together with the timing signal 123, supplied to an elevator control circuit 127. The control circuit 127, after being supplied with the degree of congestion 126 based on the timing signal 123, decides which elevator is to be operated also considering call button information at individual floors to produce a control instruction 129 for the elevator. In the above design example, one processing period is 0.3 sec. since $m = 16$. Consequently, if this example is applied to a building of 10 floors, the degree of congestion is recognized every 3 sec. a floor. Also, it is possible to control such that the frequency of detection for a particular floor is increased based on the degree of congestion or the change thereof.

Figure 31:
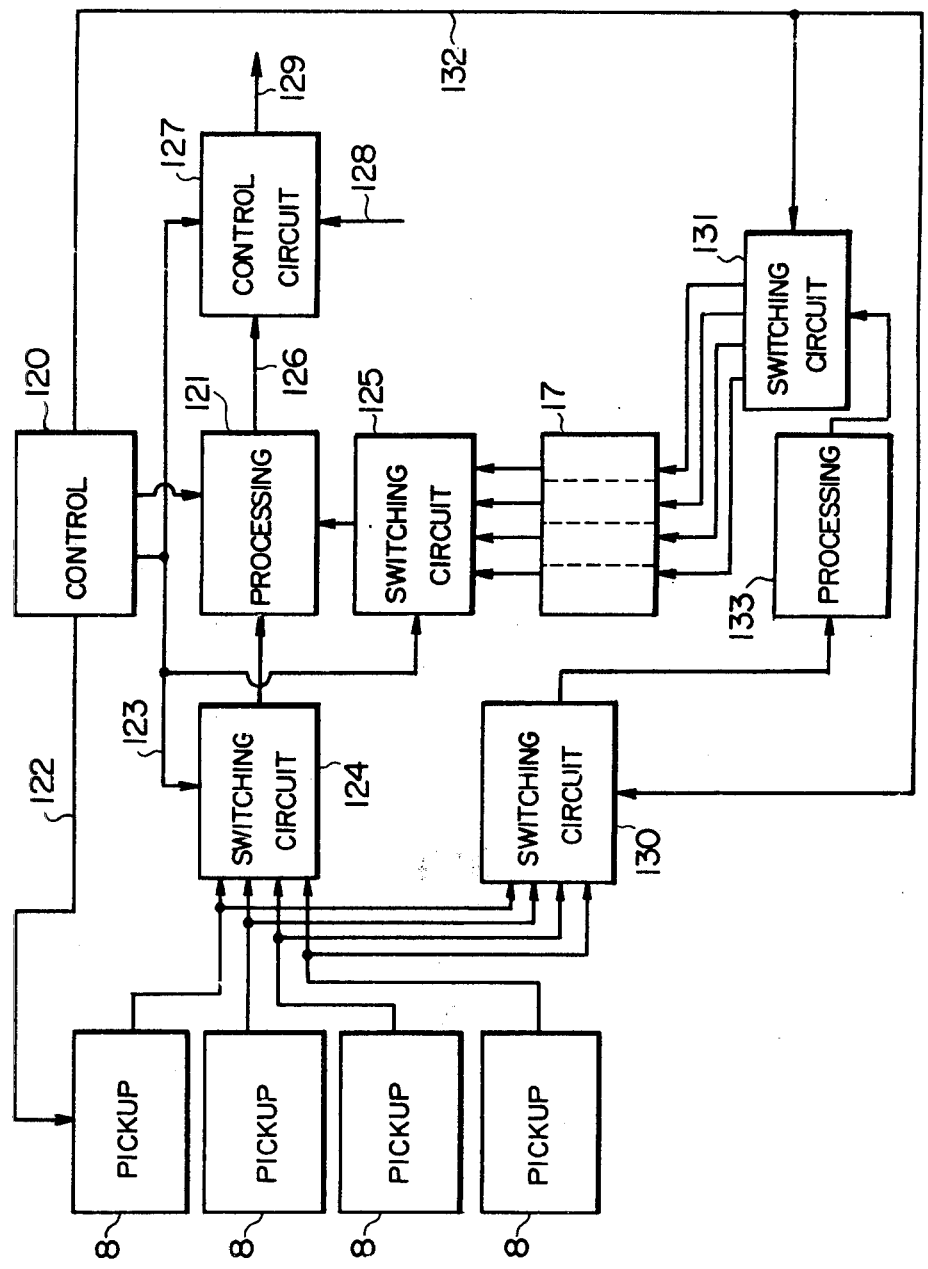

FIG. 31 is a block diagram of the whole structure of a congestion recognition system for an elevator system utilizing the system of FIG. 28. The structure of the upper half of the system of FIG. 31 is all the same as that of FIG. 30. Switching circuits 130 and 131 additionally provided are changed over successively by a signal 132 (for example, a signal produced every 100 processing cycles) from the control section 120. This change-over is not necessarily synchronous with the change-over of the switching circuits 124 and 125 by the signal 123, but generally the change-over cycle by the signal 132 is longer than that by the signal 123. The signal from the image pick-up device selected by the switching circuit 130 is supplied to a processing section. The processing section 133 includes the parts 10, 13, 15, 16, 110, 111, 112, 113, 116 and 21 in FIG. 28. The processing section 133 detects the fact that the image does not change over a plurality of processing cycles as described above and, though omitted in FIG. 31, supply a temporarily stored image to the memory circuit 17 to update the background information by the use of a signal indicating the fact that no call button is pushed (a signal corresponding to the signal 115 in FIG. 28 or the signal 128 in FIGS. 30 and 31).

Consequently, the processing section 121 is an exclusive processing section for the occupation recognition by an object. If the processing of the processing section 133 starts at the moment the switching circuits 130 and 131 are changed over to a fresh image pick-up device and if the call button on the floor on which the fresh image pick-up device is mounted is pushed, the change-over is made to the next image pick-up device immediately. When the button is not pushed (that is, when the possibility that no people are there is high), the above processing is started. If coincidence is detected between consecutive two images or a button is pushed before the predetermined number of the processed frames is reached, it is possible to change over to the next image pick-up device omitting the processing on that floor.

Also, it is possible to decide the floor which does not call to select the image pick-up device and to perform processing. In this manner the background is recognized independently of the recognition of the degree of congestion. That is, it is possible to recognize the background by the use of the fact that the image is invariable over a plurality of consecutive processing cycles and that the call button on that floor is not pushed to supply it to the memory as the latest background image.

In the above example, it is assumed that the processing sections 121 and 133 are independent of each other. However, it is possible that the switching circuits 124 and 130 are combined into a single switching circuit the image signal from which is supplied simultaneously to both processing sections 121 and 133 to enable the one to perform the recognition of the degree of occupation and the other to perform one process for the background recognition by the use of the same image. That is, each time the image pick-up devices 8 are changed over successively the corresponding image pick-up device is compared with the previously temporarily stored information. For this purpose, the temporary storages 111 alone or sets of the temporary storages 110 and 111 in FIG. 28 in the same number as that of the image pick-up devices are provided in the processing section 133 and changed over by the signal 123.

As described above, the system according to the present invention has a number of modifications and applications. Some of the applications are detection of occupancy of the picture plane by an object, and hence the congestion of people, the presence and size of an object, etc. which could not but rely on the human eye in the past.

A position detecting system utilizing the image information processing system according to the present invention will next be described. This position detecting system is used for detecting, for example the position of a particular mark applied to a box having white, black and other various colours of various brightness, a body in an uncertain shape on a complicated background such as cross-stripes.

In the past the position detection in automatically recognizing characters, figures, material bodies, etc. was made by extracting and deciding the boundary between the background and the object by detecting the change in brightness of the image. However, though this method is effective when the background other than the object is white alone or black alone, it is sometimes impossible to detect the position depending on the background.

The present invention overcomes these difficulties and provides a system capable of detecting the position by extracting a particular part such as a mark diferent from the background in the property irrespective of the background. By this system material bodies, figures, characters, etc. can be easily recognized.

Figure 32:
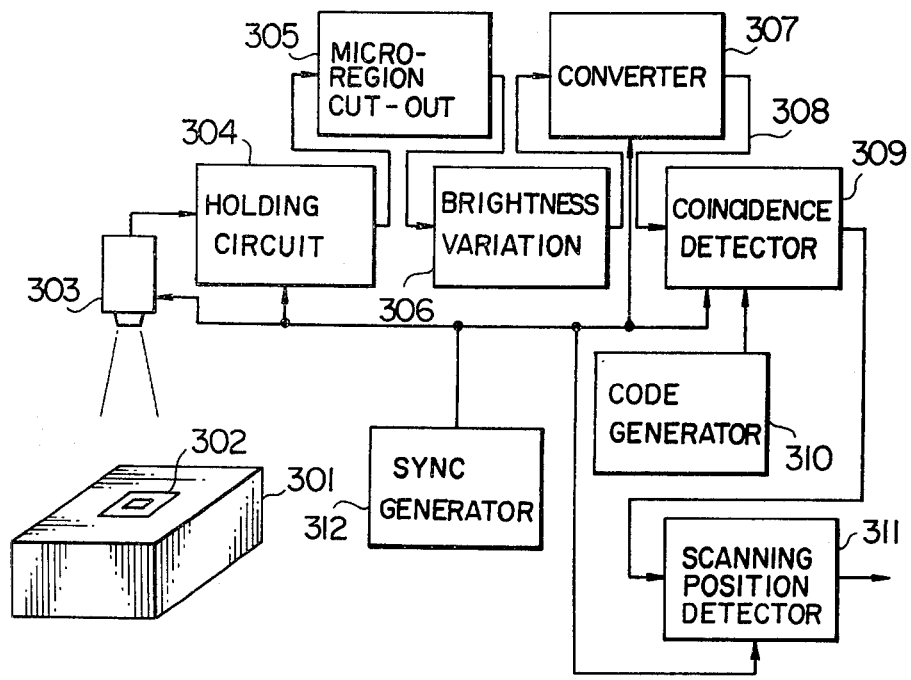
FIG. 32 is a block diagram of an embodiment of the position detecting system according to the present invention.

FIG. 32 is a block diagram of an embodiment of the position detecting system according to the present invention. A material body 301 carries a label or mark 302 thereon. An image of this mark 302 is picked up by a successively scanning type image pick-up device 303 such as a television camera. A synchronizing signal generator 312 produces a vertical synchronizing signal and a horizontal synchronizing signal which are necessary for the camera system and timing pulses (hereinafter referred to as picture element pulses) for sampling an image signal which is necessary for the subsequent processing to divide into micro-regions and to quantize.

The image signal produced by the image pick-up device 303 is sampled and quantized by a sample holding circuit 304. A micro-region cutting out apparatus 305 is composed of a delay element for one raster of the television signal and produces simultaneously the image values of a plurality of picture elements around and adjacent to a certain picture element in the image. The cut out micro-regions successively scan the entire picture plane synchronously with the scanning by the image pick-up device 303. A brightness variation producing circuit 306 receives the output of the micro-region cutting out apparatus 305 and produces the amount of variation in the surrounding brightness. A converter 307 compares the amounts of variation in the surrounding brightness produced by the circuit 306 to convert the direction of the variation in brightness at the micro-region into a code and release it synchronously with the picture element pulse. In this case, when the amount of variation in brightness is lower than a certain threshold value, a code indicating the absence of the variation in brightness is produced.

By processing through the blocks 303 to 307 in this manner the ordinary brightness image is converted into a code pattern which has the quantity indicating the direction of change in brightness as the value of the picture element. The effect and advantage of this conversion and a description of the blocks are as described above.

Figure 33A:
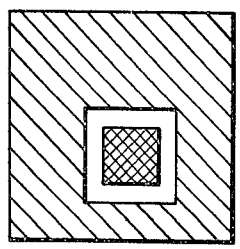
FIG. 33a is an image picked up by an image pick-up device.
Figure 33B:
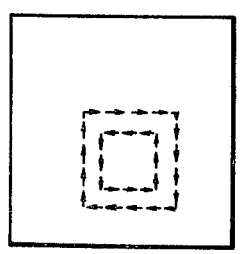

FIG. 33a is an example of the brightness image picked up by the image pick-up device 303, while FIG. 33b is an example of the image signal 308 produced by the converter circuit 307. However, since the value of each picture element of the image signal 308 is the code indicating the direction of the brightness of the picture element, each picture element is shown by the unit vector indicated by the code of the picture element in FIG. 33b for easy understanding.

The position detecting system according to the present invention is completed by additionally providing the circuits shown by the blocks 309 and 311 to the above-described image information processing system. The coincidence detecting circuit 309 compares always the output of a particular code generator 310 set in advance with the code of the image signal 308 and produces a pulse when they agrees with each other. The scanning position detecting circuit 311 receives the pulse signal from the coincidence detecting circuit 309, refers to the output of the synchronizing signal generator 312, and produces scanning position information at the time of the generation of a particular code by the particular code generator 310.

Figure 34:
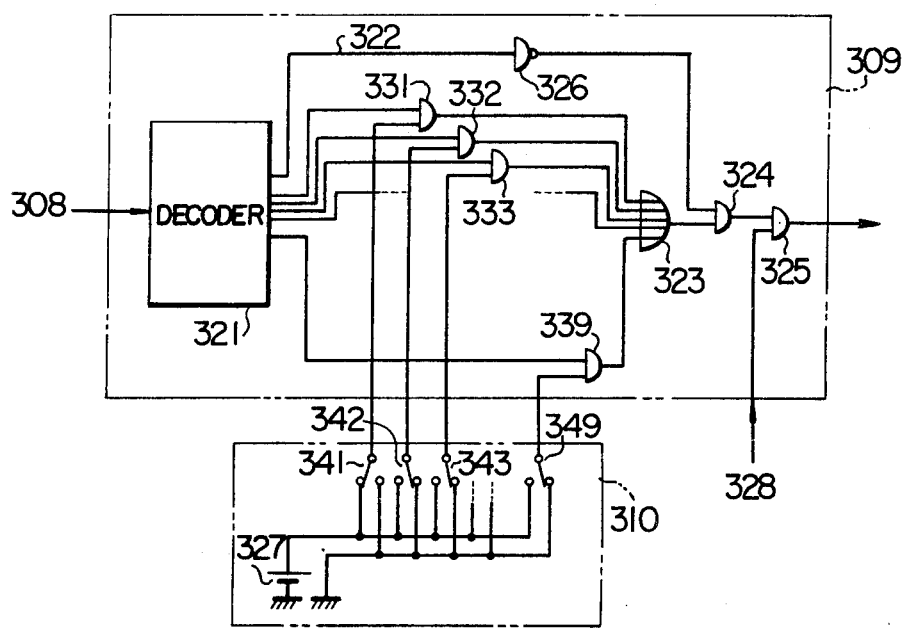
FIG. 34 is a circuit diagram of a part of the system of FIG. 32.

FIG. 34 is a practical structure of the coincidence detecting circuit 309 and the particular code generator 310. The coded image signal 308 is decoded by a decoder 321 at every picture element. Reference numeral 322 designates a signal line for a signal which becomes 1 when the code indicating the absence of the change in the brightness in the corresponding part of the original image is decoded by the decoder 321. The other signal lines are for the signals corresponding to the changes in the brightness in various direction.

On the other hand, a group of switches 341 to 349 in the particular code generator 310 correspond to respective codes indicating the direction of change in brightness. By shifting the switch for the desired position detection to the left the code corresponding thereto can be appointed. For example, if the switch 341 is shifted to the left, an AND gate 331 is activated to enable an OR gate 323 to become 1 only when the corresponding code is decoded by the decoder 321.

If gates 326 and 324 are made to be a NAND gate and an AND gate, respectively, the AND gate 324 always produces 1 while the image signal 308 is presenting the code appointed by the group of switches of the particular code generator 310. Consequently, if supplied with the above-described picture element pulse signal 328, an AND gate 325 releases a pulse only when the image signal 308 is of the appointed code.

Figure 35:
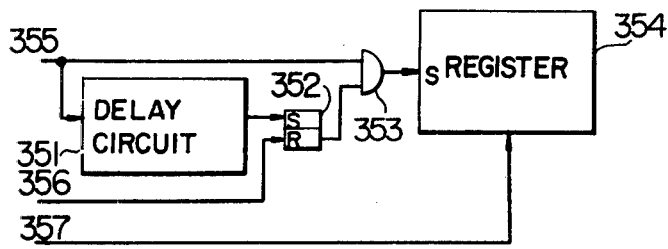
FIGS. 35 and 36 are embodiments of the longitudinal and transverse position detecting circuits, respectively.

It is sufficient for the position detection to detect the vertical position, i.e. the V-coordinate of the uppermost picture element on the picture plane among the picture elements having the appointed code and the horizontal position, i.e. the H-coordinate of the leftermost picture element. FIG. 35 is an example of the V-coordinate position detecting circuit and FIG. 36 is an example of the H-coordinate position detecting circuit.

In FIG. 35 a register 354 stores the detected V-coordinate. Reference numeral 357 designates a V scanning position signal produced by the synchronizing signal generator 312. If a pulse signal 355 from the coincidence detecting circuit 309 in FIG. 32 is supplied to the register 354 as its set pulse and if the V scanning position signal is set in the register 354, the vertical position is determined. However, to hold the upper end position in the register 354 it is necessary to make only the first pulse a set pulse and to neglect the second and succeeding pulses. Consequently, a flip-flop 352 is set by the output 355 of the coincidence detecting circuit 309 supplied through an appropriate delay circuit 351 and an AND gate 353 is activated by the output of the flip-flop 352.

Reference numeral 356 designates the V synchronizing signal from the synchronizing signal generator 312 for resetting the flip-flop 352 to open the gate 353. By this signal the first position signal, i.e. the upper end position is stored in the register 354 at every frame of the video signal.

Figure 36:
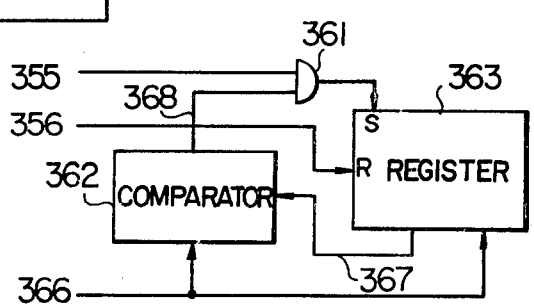

Referring to FIG. 36 reference numerals 363 and 366 designate a register for storing the detected H-coordinate, and the H scanning position signal produced by the synchronizing signal generator 312, respectively. It is necessary for the detection of the left end position to store the minimum H-coordinate in the register 363. Consequently, a comparing circuit 362 always compares the contents 367 of the H-coordinate register 363 with the H scanning position signal 366 and, when the contents 367 of the register 363 is larger, the output 368 of the comparison circuit 362 is made 1 to open an AND gate 361. Subsequently, the contents of the H scanning position signal 366 are set in the register 363 afresh by the output pulse 355 of the coincidence circuit 309.

A signal 356 is the V synchronizing signal from the synchronizing signal generator 312 for setting in advance the maximum number in the register 363 at the starting time of the image scanning. By this signal the left end position coordinate at the frame is stored in the register 363 at the scanning end time of the frame.

Next, the practical effect and advantage of the position detecting system according to the present invention will be described.

FIG. 37a is an image of the same mark as in FIG. 33a placed on a white body, and FIG. 37b is a code pattern thereof. As shown, even if the same mark, the difference in brightness may or may not appear at the edge thereof depending on the colour of the background body. If the background is grey which is intermediate therebetween, the boundary between the mark and the body becomes indistinct. Consequently, by a conventional method of detecting the position by extracting only a brightness varying part the detectable position varies depending on the degree of brightness of the background and hence it is impossible to detect always the same position stably.

However, according to the present invention, when, for example, the left end is to be detected, the brightness changes from bright to dark in scanning from left to right and the boundary is in the vertical direction. Consequently, only the downwardly directed code is extracted. When the upper end is to be detected, similarly only the leftwardly directed code is extracted. Then, the boundary part which may or may not be detected depending on the brightness of the background can be neglected, so that very simple and stable position detection is possible.

FIG. 38a is an example in which a round body is placed on a background of simple cross-stripes. However, in FIG. 38b the code corresponding to oblique 45° is deleted and not shown. If the code from which the preset oblique direction is deleted is used like this, it is possible to detect stably the position of the required round body even if oblique cross-stripes are present. Consequently, if the position detecting system according to the present invention is used, the position detection of a body on a far more manifold background than a convential one is possible because the position detection is made by the use of the difference in the properly relating to the pattern between the background and the body to be detected.

Next, an image processing system for relieving a contour image of a body on a background against a two-dimensional image subjected to photoelectric conversion by an image pick-up device will be described. Such a system can be utilized for the preliminary processing for detecting the position of a box for example by separating and relieving the contour of the box from and against noise produced by a label on the surface of the box or the background.

FIG. 39a is an image of a horizontally placed cuboid 401 picked up by an image pick-up device from above. This image is sampled square-meshwise at appropriate time intervals to be quantized spatially. Then, the direction of change in brightness of the quantized picture element is determined by a suitable means at each sampling point.

Figure 39C:
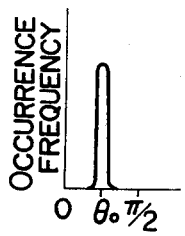

Here, the angle between the direction of change in brightness of each picture element and the x-axis is taken as abscissa, and the occurrence frequency of the picture elements of the sampling points having each direction in one image plane is taken as ordinate. Then, since the edges of the cuboid are are orthogonal, a curve having four peaks at intervals of $\pi/2$ is obtained as shown in FIG. 39b. Consequently, if the occurrence frequencies are summed up every $\pi/2$, it turns out to be a very high peak as shown in FIG. 39c. The position $\theta_o$ at which this peak falls represents the attitude of the horizontally placed cuboid.

The case in which various noises occur in the image of FIG. 39a will next be considered.

Figure 40A:
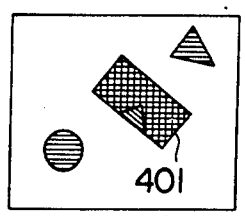
FIGS. 40a and 40b are diagrams for explaining the case in which noise is present in the image.
Figure 40B:
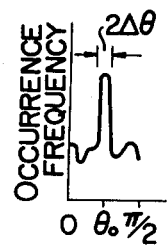

FIG. 40a is an example in which in addition to the cuboid 401 noise such as a circle, triangle, label, etc. are present. In this case, since the circle and the triangle have no peaks at intervals of $\pi/2$ as different from the cuboid, in the curve of FIG. 39c which is the sum of the occurrence frequencies every $\pi/2$ the picture element at each sampling point functions as a noise so that a large peak does not occur.

Figure 41:
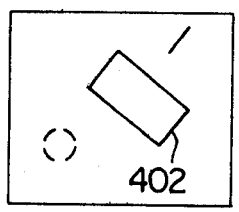
FIG. 41 is an explanatory diagram of an example of the output image from which noise is eliminated.

Consequently, if the angle $\theta_o$ at which the maximum peak occurs is detected from the curve of FIG. 39c, and if only the picture elements having the directions falling within the four intervals $(\theta_o - \Delta\theta) \sim (\theta_o + \Delta\theta)$, $(\theta_o + \frac{\pi}{2} - \Delta\theta) \cdot (\theta_o + \frac{\pi}{2} + \Delta\theta)$, $(\theta_o + \pi - \Delta\theta) \sim (\theta_o + \pi + \Delta\theta)$, $(\theta_o + \frac{3}{2}\pi - \Delta\theta) \sim (\theta_o + \frac{3}{2}\pi + \Delta\theta)$ where $\Delta\theta$ is a very small constant, are extracted and expressed, the greater part of the noises are eliminated as shosn in FIG. 41 to relieve the contour 402 of the cuboid. Of course, in this case, it is possible to relieve another predetermined figure such as a regular triangle, regular pentagon, or the like in a similar manner.

Figure 42:
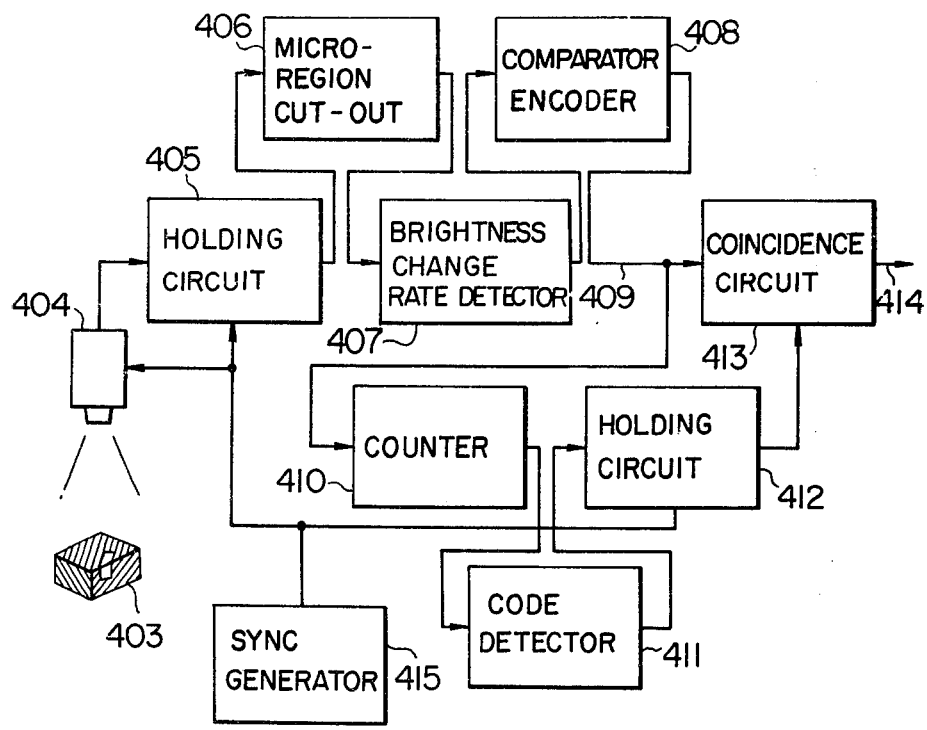
FIG. 42 is a block diagram of another processing system according to the present invention.

FIG. 42 is a block diagram of the structure of an embodiment of the processing system according to the present invention. An image of a material body 403 the contour of which is to be extracted is picked up by a serially scanning type image pick-up device 404 such as a television camera. A synchronizing signal generator 415 produces a vertical synchronizing signal and a horizontal synchronizing signal which are necessary for the camera system and timing pulses (hereinafter referred to as picture element pulses) for sampling an image signal which is necessary for the subsequent processing to divide into micro-regions and to quantize.

The image signal produced by the image pickup device 404 is sampled and quantized by a sample holding circuit 405. A micro-region cutting out apparatus 406 is composed of a delay element for one raster of the television signal and produces simultaneously the image values of a plurality of picture elements vertically and horizontally adjacent to the image. The microregions cut out by the cutting out apparatus 406 scan successively the entire picture plane synchronously with the scanning by the image pick-up device 404.

A brightness variation rate detecting circuit 407 receives the output of the micro-region cutting out apparatus 406 and produces the vertical and horizontal brightness change rates of each micro-region. A comparator-encoder circuit 408 compares the vertical and horizontal brightness change rates supplied by the brightness change rate detecting circuit 407 to convert the direction of the change in brightness at the micro-region into a quantized code and release it synchronously with the picture element pulse. When both vertical and horizontal brightness variation rates are lower than a predetermined threshold value, the comparator-encoder circuit 408 produces a code indicating the absence of the change in brightness.

By processing through the blocks 404 to 408 in this manner the ordinary brightness image is converted into a code pattern which has the quantity indicating the direction of change in brightness as the value of the picture element.

Figure 43A:
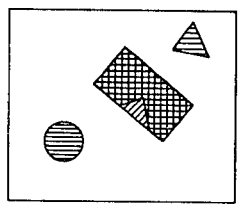
FIGS. 43a and 43b are explanatory diagrams of an example of the image picked up by an image pick-up device and the code signal.
Figure 43B:
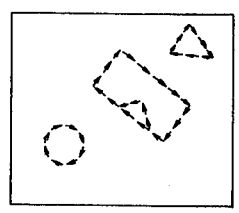

An example of the brightness image picked up by the image pick-up device is shown in FIG. 43a, and an example of the image output 409 released by the comparator-encoder circuit 408 in FIG. 42 is shown in FIG. 43b. Though the value of each picture element of the image output 409 is the code indicating the direction of the brightness of the picture element, in FIG. 43b each picture element is expressed by a unit vector having the direction indicated by the code for the sake of an easy understanding.

The system of FIG. 42 is completed by additionally providing blocks 410 to 413. The block 410 is a counter circuit which counts codes which are different in the direction one another by $\pi/2$ as one frame collectively. The block 411 is a maximum occurrence code detecting circuit which compares the values counted by the counter circuit 410 to detect the maximum occurrence code. The maximum occurrence code detecting circuit 411 produces, each time the picture plane scanning for one frame is completed, the maximum occurrence code of the frame.

The block 412 is a holding circuit which holds the maximum occurrence code produced by the maximum occurrence code detecting circuit 411 for a time duration of the scanning of the next one frame. The block 413 is a coincidence circuit which compares the image signal, i.e. the code signal 409 which is converted into a code indicating the direction of change in brightness with the output of the holding circuit 412 to produce 1 as its output 414 when coincidence occurs and produces 0 when coincidence does not occur.

Figure 44:
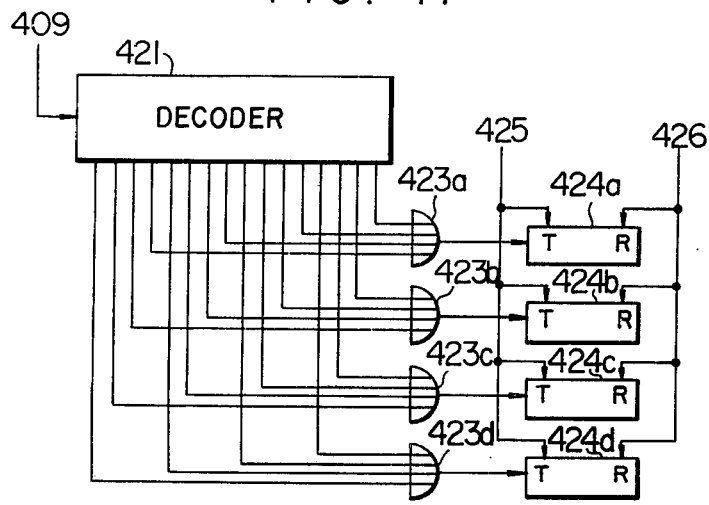
FIG. 44 is an embodiment of the counter circuit for counting the code signal.

FIG. 44 is an embodiment of the counter circuit 410. The code signal of each picture element is decoded by a decoder 421. When a code signal indicating the absence of the direction of brightness is supplied, all the outputs of the decoder 421 become 0. Though in this embodiment the direction of brightness is assumed to be quantized in 16 directions, it may be quantized in any number of directions such as in 32 or 64 directions.

An OR gate 423a superimposes code signals which are different in the direction from one another by $\pi/2$. Reference numeral 424a designates a counter which counts the output of the OR gate 423a. The timing signal for the counting by the counter 424a is supplied by the synchronizing signal generator 415 in FIG. 42 and the counter 424a is set by a pulse signal 425 synchronizing with the picture element pulse. It is reset by a pulse signal 426 from the synchronizing signal generator 415 at the time of the start of the scanning of one frame.

OR gates 423b to 423d and counters 424b to 424d perform a similar operation for a different group of codes. Then, it is possible to count codes which are different in the direction from one another by $\pi/2$ as one frame collectively.

Figure 45:
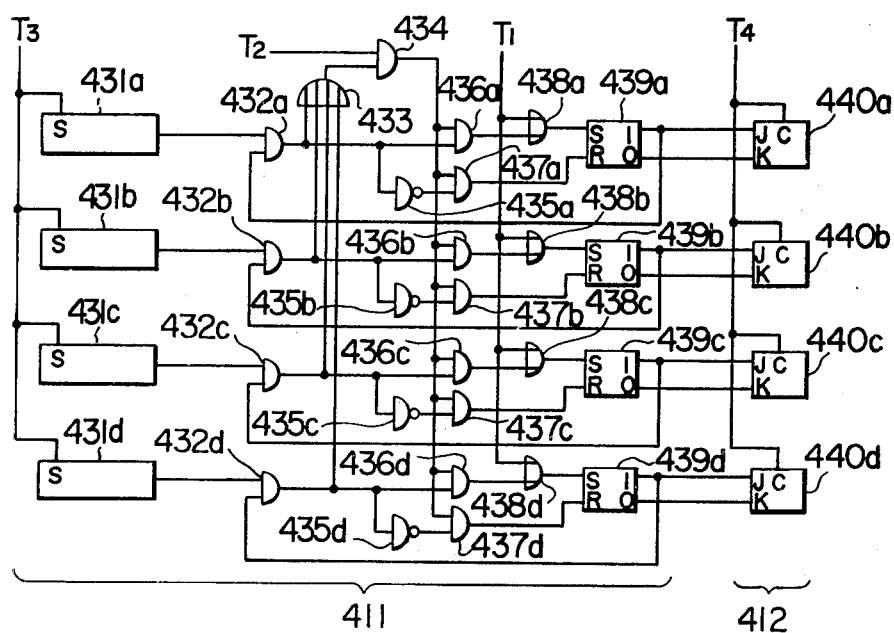
FIG. 45 is an embodiment of the maximum code detecting circuit.
Figure 46:
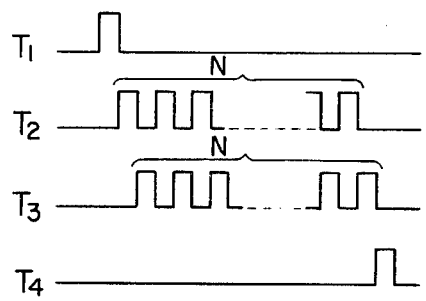
FIG. 46 is an explanatory diagram of timing pulse series.

FIG. 45 is an embodiment of the maximum occurrence code detecting circuit 411 and the holding circuit 412. Shift registers 431a to 431d store the contents of the counters 424a to 424d in FIG. 44 which are successively shifted to the right by a timing pulse $T_3$ bit by bit. Consequently, the number of bits of the shift registers 431a to 431d is equal to the number of bits of the counters 424a to 424d. The right-hand side of the shift registers 431a to 431d is of more significant digit places and the left-hand side thereof is of less significant digit places. Reference characters $T_1$ to $T_4$ designate timing pulses as shown in FIG. 46 and produced by the above-described synchronizing signal generator 415. Reference numerals 439a to 439d designate set-reset flip-flops provided correspondingly to the shift registers 431a to 431d. Reference numerals designate JK flip-flops.

The operation of the circuit of FIG. 45 will next be described in relation to the timing pulses $T_1$ to $T_4$. All the timing pulses $T_1$ to $T_4$ are produced during the blanking time in the vertical scanning by the image pick-up device. The maximum occurrence code detection processing is performed within this blanking time.

When the timing pulse $T_1$ is produced, all the flip-flops 439a to 439d are set to 1. At this time the AND gates 432a to 432d pass the right-hand side outputs of the shift registers 431a to 431d as they are. Consequently, when next the first pulse of the timing signal $T_2$ is produced, the output of an OR gate 433 becomes 1 if there is 1 on the right-hand side of any one of the shift registers 431a to 431d, and the contents of the shift register at its right end are set in the flip-flop 439a to 439d as they are through AND gate 436a to 436d and OR gate 438a to 438d.

To the contrary, for the shift register whose right end, i.e. the most significant bit is 0 among the shift registers 431a to 431d the contents of the corresponding flip-flop are all reset to 0 through NAND gate 435a to 435d and AND gate 437a to 437d. If there is not 1 at the right end of any shift register, the timing pulse $T_2$ is interrupted by an AND gate 434, so that the contents of the flip-flops 439a to 439d are maintained as they are at 1 or 0.

When, next, the timing pulse $T_3$ is produced, the contents of the shift registers 431a to 431d are all shifted to the right by 1 bit so that the contents of the second significant bit come to the right end of the shift register. At this time, the output of the shift register the contents of the flip-flop 439a to 439d corresponding to which are 0 among the shaft registers 431a to 431d is blocked by the AND gate 432a to 432d because the output of the corresponding flipflop is 0 so that the output of the register is excluded from comparison processing. If there is any shift register the right end of which is 1 among the shift registers the flip-flops corresponding to which are 1, the contents of the flip-flop which is 1 and the right end of the shift register corresponding to which is 0 is reset afresh to 0 when the timing pulse $T_3$ is supplied. If there is no shift register whose right end is 1 among the shift registers 431a to 431d the flip-flops corresponding to which are 1, the contents of the flip-flops 439a to 439d are maintained unchanged.

In this manner if the timing pulses are supplied alternately to the shift registers by the number of the digit places thereof, the contents of the shift registers 431a to 431d are compared successively from the most significant digit place, and only the flip-flop corresponding to the shift register storing the maximum number remains at 1. Finally the timing pulse $T_4$ is supplied, the contents of the flip-flop 439a to 439d are held by the JK flip-flop 440a to 440d. By this processing most occurrence code detection can be made.

Figure 47:
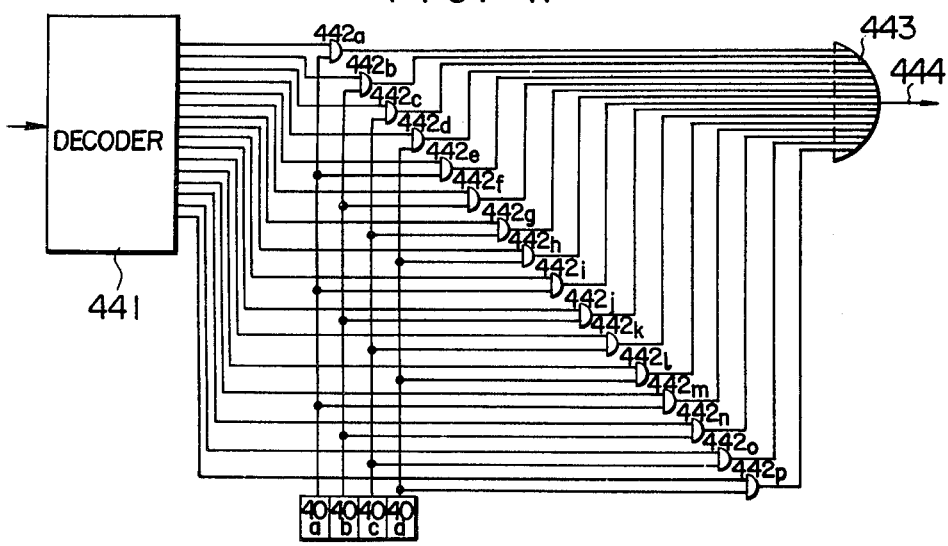
FIG. 47 is an embodiment of a coincidence circuit.
Figure 48:
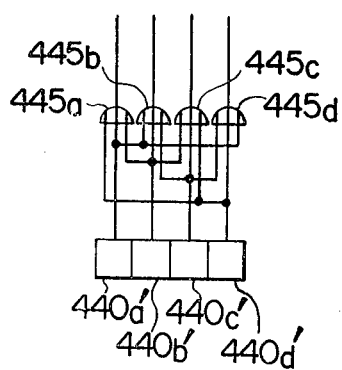
FIG. 48 is a connection diagram of a part of the circuit used in another embodiment of the coincidence circuit.

FIG. 47 is an embodiment of the coincidence circuit 413 in FIG. 42. Reference numerals 440a' to 440d' designate registers corresponding to the JK flip-flops 440a to 440d in FIG. 45. Reference numeral 441 designates a decoder. If AND gates 442a to 442p are connected as shown in FIG. 47, an OR gate 443 produces 1 as its output 444 when codes in agreement with four directions at intervals of $\pi/2$ corresponding to the maximum occurrence code are supplied to the decoder 441.

Actually, in many cases the output is intended to be produced also when the maximum occurrence code is supplied together with the codes around it. This is possible by connecting OR gates 445a to 445d to the outputs of registers 440a' to 440d'.

Figure 49:
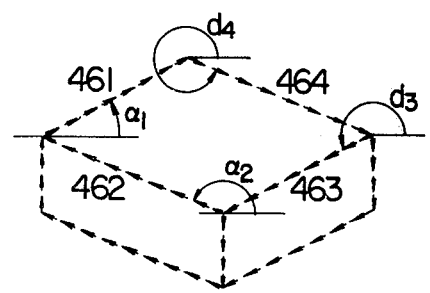
FIG. 49 is a diagram for explaining the principle of another application of the present invention.

In the above embodiment the image of the horizontally placed cuboid is picked up from right above. However, this scheme is also applicable to the case in which the cuboid is viewed obliquely. When the cuboid is looked down obliquely, the code pattern thereof is as shown in FIG. 49. In this case, except the edges which look always vertically, if the angles between four edge lines 461 to 464 and the X-axis are expressed by $\alpha_1 - \alpha_4$, the following relations stand:

$$\alpha_1 + \pi = \alpha_3$$
$$\alpha_2 + \pi = \alpha_4$$

If the angle between the optical axis of the image pick-up device and a horizontal plane is denoted by $\gamma$, the relation between $\alpha_1$ and $\alpha_2$ is expressed by a relatively simple formula with $\gamma$ as a parameter.

Different from the manner in which the curve in FIG. 39c is obtained by summing the occurrence frequencies at every $\pi/2$ shown in FIG. 39b, the information corresponding to the curve in FIG. 39c is provided by summing the distributions of occurrrence frequencies of the codes satisfying the relations among $\alpha_1 - \alpha_4$ and $\gamma$. Such a processing is, when $\gamma$ is known previously, very effective as a processing of noises.

As described above, the present invention can relieve the contour of a desired body deleting the information of the surface, miscellany in the background, etc. Consequently, when recognizing visually a box or the like to which a label or the like is applied, this system is an effective preliminary processing system.

Since the attitude of a predetermined body, that is, the attitude $\theta_o$ of the cuboid in FIG. 39a can be detected in the course of processing, it is possible to control the optical system of the image pick-up device or a visual system by this information or to control so that one edge line of a cuboid is always horizontal relative to the picked up image.

Such an image input system not only facilitates the detection of the position of a body, but also is very effective to read the information on the surface of a body.

What we claim is:

1. A pattern recognition system comprising:
   at least one pick-up device for converting an image of a picture plane into an electrical signal indicative thereof;
   means for successively taking out of a plurality of electrical signals, each electrical signal being representative of a divided region of the image of the picture plane, region by region from the output of said pickup device;

means for producing first and second signals indicating rates of changes in brightness along different directions of a region by reference to signals representative of adjacent regions thereto;

means for producing third signals, each signal indicating the direction of the change in the brightness within each of said regions, from said first and second signals;

means for encoding said third signals into a code signal by classifying said third signals in accordance with directions of the change in the brightness, counting said signals classified into said respective directions, and digitizing the respective counted values in accordance with a predetermined value;

means for storing in advance a code signal indicative of an image corresponding to the background of the picture plane; and means for comparing the code signal from said encoding means with the code signal from said storing means to detect the degree of disagreement therebetween as an indication of an object in the picture plane.

2. A pattern recognition system according to claim 1, in which each of said first and second signal producing means includes a first circuit for adding signals representative of the brightness within a plurality of regions adjacent one side of the region being examined and providing an output, a second circuit for adding signals representative of the brightness within a plurality of regions adjacent to the other side of said region being examined and providing an output, and a third circuit for obtaining a difference between the outputs of said first and second circuits.

3. A pattern recognition system according to claim 1, in which said third signal producing means comprises, a plurality of adders for adding said first and second signals at predetermined different rates, means for binary digitizing the outputs of said adders in accordance with a predetermined value, and logic circuit means for producing a signal representative of the direction of the brightness from combinations of the binary digitized signals.

4. A pattern recognition system according to claim 1, in which said encoder means comprises, counter circuits for counting said signals representing the directions of the change in the brightness respectively, and means for binary digitizing each of said outputs of said counters in accordance with the predetermined value to form a code signal indicative of a feature of the image of the object.

5. A pattern recognition system according to claim 1, in which the counting means counts signals weighted in dependence upon the position of the region in the picture plane.

6. A pattern recognition system according to claim 1, further comprising:

means for temporarily storing the code signal from said encoder means;

means for comparing one code signal indicative of an image at one time with another code signal indicative of an image at different time by the use of signals from said temporarily storing means;

means for counting the number of times the code signals agree; and means for transferring the contents in the temporary storing means to said means which stores a code signal representative of a background of the picture plane when the output of said counter is over a predetermined value.

7. A pattern recognition system according to claim 1, further comprising a plurality of pick-up devices for respectively converting images of a picture plane into electrical signals respectively, and means for selectively providing said electrical signals to the region take-out means.

* * * * *